United States Patent
Pavlovski et al.

(10) Patent No.: US 12,498,504 B2
(45) Date of Patent: Dec. 16, 2025

(54) METHOD AND SYSTEM FOR SOLAR POWER FORECASTING

(71) Applicant: GREEN POWER LABS INC., Dartmouth (CA)

(72) Inventors: Alexandre Pavlovski, Bedford (CA); Dimitriy Anichkov, Somerville, NJ (US); Vladimir Kostylev, Bedford (CA); Igor Yashayaev, Halifax (CA)

(73) Assignee: GREEN POWER LABS INC., Dartmouth (CA)

( * ) Notice: Subject to any disclaimer, the term of this patent is extended or adjusted under 35 U.S.C. 154(b) by 527 days.

(21) Appl. No.: 18/074,474

(22) Filed: Dec. 3, 2022

(65) Prior Publication Data

US 2023/0103959 A1  Apr. 6, 2023

Related U.S. Application Data

(63) Continuation-in-part of application No. 15/755,373, filed as application No. PCT/CA2016/000218 on Aug. 29, 2016, now abandoned.

(60) Provisional application No. 62/211,924, filed on Aug. 31, 2015.

(51) Int. Cl.
  *G01W 1/10* (2006.01)
  *G06N 20/00* (2019.01)

(52) U.S. Cl.
  CPC .............. *G01W 1/10* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 10,409,925 B1 | 9/2019 | Hoff | |
| 2011/0276269 A1* | 11/2011 | Hummel | G01W 1/10 702/3 |
| 2013/0054662 A1 | 2/2013 | Coimbra | |
| 2014/0095076 A1 | 4/2014 | Marwah et al. | |
| 2014/0278107 A1 | 9/2014 | Kerrigan et al. | |
| 2015/0276980 A1 | 10/2015 | Menicucci et al. | |

(Continued)

OTHER PUBLICATIONS

Bartlett, J. S., A. M. Ciotti, R. F. Davis, and J. J. Cullen (1998), "The Spectral Effects of Clouds on Solar Irradiance", J. Geophys. Res., vol. 103, No. C13, pp. 31017-31,031, Dec. 15, 1998 (Year: 2018).

(Continued)

Primary Examiner — Lina Cordero
(74) Attorney, Agent, or Firm — CONNEELY PC; Joseph Conneely

(57) ABSTRACT

A method for generating a solar power output forecast for a solar power plant, comprising: using a processor, in a training mode, generating a trained artificial intelligence model using historical output data and historical input data including historical physical subsystem input data and historical physical subsystem forecasts for the solar power plant; in a runtime mode, for a predetermined forecast horizon, applying the trained artificial intelligence model to current input data including current physical subsystem input data and current physical subsystem forecasts for the solar power plant to produce the solar power output forecast; and, presenting the solar power output forecast on a display.

10 Claims, 17 Drawing Sheets

(56) References Cited

U.S. PATENT DOCUMENTS

| | | | |
|---|---|---|---|
| 2018/0203160 A1* | 7/2018 | Dong | H02M 3/156 |
| 2018/0275314 A1 | 9/2018 | Pavlovski et al. | |
| 2020/0041550 A1* | 2/2020 | Borean | G06N 3/045 |
| 2020/0099226 A1* | 3/2020 | Monforte | G06Q 10/04 |
| 2020/0257019 A1* | 8/2020 | Bing | G01W 1/12 |

OTHER PUBLICATIONS

Ekpenyong, E. E. and Anyasi, F. I., "Effect of Shading on Photovoltaic Cell", IOSR Journal of Electrical and Electronics Engineering (IOSR-JEEE), e-ISSN: 2278-1676, p-ISSN: 2320-3331, vol. 8, Issue 2 (Nov.-Dec. 2013), pp. 01-06 (Year: 2013).

Morales, et al., "A Simple Physical Model to Estimate Global Solar Radiation in the Central Zone of Chile" (Year: 2009).

M. J. Reno, J.S. Stein, "Using Cloud Classification to Model Solar Variability" (Year: 2013).

Dolara, et al., "A Physical Hybrid Artificial Neural Network for Short Term Forecasting of PV Plant Power Output", Energies 2015, 8, 1138-1153, Feb. 3, 2015 (Year: 2015).

Wu, et al., "A Novel Hybrid Model for Short-Term Forecasting in PV Power Generation", International Journal of Photoenergy, vol. 2014, Article ID 569249, Jun. 30, 2014 (Year: 2014).

Mellita, et al., "Artificial Intelligence Techniques for Photovoltaic Applications: A Review", Progress in Energy and Combustion Science 34 (2008) 574-632, Mar. 4, 2008 (Year: 2008).

International Searching Authority (ISA/CA), PCT/CA2016/000218; Written Opinion and International Search Report; Dec. 7, 2016.

"International Energy Agency Photovoltaic Power Systems Programme", Photovoltaic and Solar Forecasting: State of the Art, IEA PVPS Task 14, Subtask 3.1, Report IEA-PVPS T14-01: 2013, Oct. 2013, ISBN 978-3-906042-13-8.

* cited by examiner

METHOD AND SYSTEM FOR SOLAR POWER FORECASTING

This application is a continuation-in-part of U.S. patent application Ser. No. 15/755,373, filed Feb. 26, 2018, and incorporated herein by reference, which is a national phase entry of International Patent Application No. PCT/CA2016/000218, filed Aug. 29, 2016, and incorporated herein by reference, which claims priority from and the benefit of the filing date of U.S. Provisional Patent Application No. 62/211,924, filed Aug. 31, 2015, and the entire content of such application is incorporated herein by reference.

FIELD OF THE APPLICATION

This application relates to the field of environmental and energy forecasting, and more specifically, to a method and system for solar power forecasting.

BACKGROUND OF THE APPLICATION

Operational solar power forecasting (e.g., intra-hour, hour(s) ahead, and day(s) ahead) has become a critically important service for solar power producers, utilities, and electricity system operators. Different market players use operational solar power forecasting for different purposes. For example, solar power producers may use it for optimized operations and management, and for market operations. Power utilities may apply forecasts to market, transmission and distribution management. And, electricity system operators may use forecasts for market management and power reliability applications.

Existing forecasting methods used in the industry may be broadly characterized as physical or statistical. The physical approach uses solar irradiation and photovoltaic ("PV") power conversion models to generate PV plant output forecasts. In contrast, the statistical approach relies primarily on past data to "train" models, with little or no reliance on solar and PV models. (For example, see "INTERNATIONAL ENERGY AGENCY PHOTOVOLTAIC POWER SYSTEMS PROGRAMME", Photovoltaic and Solar Forecasting: State of the Art, IEA PVPS Task 14, Subtask 3.1, Report IEA-PVPS T14-01:213 October 2013, ISBN 978-3-906042-13-8, page 6, which is incorporated herein by reference.)

The physical approach with respect to a single well characterized PV system is illustrated in FIG. 1. The above noted IEA PVPS report on Photovoltaic and Solar Forecasting (2013) states the following: "The main variables influencing PV output power are the irradiance in the plane of the PV array, $G_i$, and the temperature at the back of the PV modules (or cells), $T_m$. For non-concentrating PV, the relevant irradiance is global irradiance in the array plane, while for concentrating PV it is direct normal irradiance. Other variables, such as the incidence angle of beam irradiance and the spectral distribution of irradiance, are included in some PV models, but high accuracies have been obtained with models that do not incorporate these effects. Depending on data availability, PV models can either be fitted to historical data [ . . . ] or else based on manufacturer specifications. . . . Since neither $G_i$ nor $T_m$ are output by weather forecasts, these must be obtained instead from solar and PV models that calculate these from PV system specifications and weather forecasts, such as global horizontal irradiance (GHI) and ambient temperature forecasts. These solar and PV models make up the intermediate step [ . . . ]. $T_m$ can be modelled from PV system specifications and from GHI and ambient temperature and, optionally, wind speed". (Again, see "INTERNATIONAL ENERGY AGENCY PHOTOVOLTAIC POWER SYSTEMS PROGRAMME", Photovoltaic and Solar Forecasting: State of the Art, IEA PVPS Task 14, Subtask 3.1, Report IEA-PVPS T14-01:213 October 2013, ISBN 978-3-906042-13-8, page 6, which is incorporated herein by reference.)

In contrast, the statistical approach does not use solar or PV models. Its starting point is a training dataset that contains PV power, as well as various inputs or potential inputs, such as numerical weather predication ("NWP") model outputs (i.e., GHI, $T_m$ or other), ground station or satellite data, PV system data, and so on. This dataset is used to train models, such as autoregressive or artificial intelligence models, that output a forecast of PV power at a given time based on past inputs available at the time when the model is run. (Again, see "INTERNATIONAL ENERGY AGENCY PHOTOVOLTAIC POWER SYSTEMS PROGRAMME", Photovoltaic and Solar Forecasting: State of the Art, IEA PVPS Task 14, Subtask 3.1, Report IEA-PVPS T14-01:213 October 2013, ISBN 978-3-906042-13-8, page 7, which is incorporated herein by reference.)

Hybrid approaches have also been proposed. Physical and statistical approaches to solar power forecasting may be blended. The physical approach frequently makes use of model output statistics ("MOS") methods that compare forecasts to observations over a training period in order to correct forecasts, for example, by removing systematic errors. Meanwhile, the best statistical approaches make use of the data developed by physical models to select input variables. (See "INTERNATIONAL ENERGY AGENCY PHOTOVOLTAIC POWER SYSTEMS PROGRAMME", Photovoltaic and Solar Forecasting: State of the Art, IEA PVPS Task 14, Subtask 3.1, Report IEA-PVPS T14-01:213 October 2013, ISBN 978-3-906042-13-8, page 7, which is incorporated herein by reference.)

However, one problem with these methods and systems is that they are typically too general for practical or effective implementation. In addition, these methods and systems are typically limited with respect to the accuracy of forecasts that they produce.

A need therefore exists for an improved method and system for solar power forecasting. Accordingly, a solution that addresses, at least in part, the above and other shortcomings is desired.

SUMMARY OF THE APPLICATION

According to one aspect of the application, there is provided a method for generating a solar power output forecast for a solar power plant, comprising: using a processor, in a training mode, generating a trained artificial intelligence model using historical output data and historical input data including historical physical subsystem input data and historical physical subsystem forecasts for the solar power plant; in a runtime mode, for a predetermined forecast horizon, applying the trained artificial intelligence model to current input data including current physical subsystem input data and current physical subsystem forecasts for the solar power plant to produce the solar power output forecast; and, presenting the solar power output forecast on a display.

In accordance with further aspects of the application, there is provided an apparatus such as a data processing system, a forecasting system, a control system, etc., a method for adapting same, as well as articles of manufacture such as a computer readable medium or product and computer program product or software product (e.g., comprising a non-transitory medium) having program instructions recorded thereon for practising the method of the application.

BRIEF DESCRIPTION OF THE DRAWINGS

Further features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EXAMPLE EMBODIMENTS

In the following description, details are set forth to provide an understanding of the application. In some instances, certain software, circuits, structures and methods have not been described or shown in detail in order not to obscure the application. The term "data processing system" or "system" is used herein to refer to any machine for processing data, including the computer systems, forecasting systems, control systems, and network arrangements described herein. The present application may be implemented in any computer programming language provided that the operating system of the data processing system provides the facilities that may support the requirements of the present application. Any limitations presented would be a result of a particular type of operating system or computer programming language and would not be a limitation of the present application. The present application may also be implemented in hardware or in a combination of hardware and software.

As mentioned above, the existing approaches to solar power forecasting may limit the accuracy of forecasts produced. However, physical and statistical models or a blend of those may be used in forecasting many variable phenomena. According to one embodiment of the present application, based on these general concepts, a new hybrid forecasting system is described that provides improved forecast accuracy due to its specific selection of physical and statistical models for matching characteristics of the forecast horizon and due to the efficient training, calibration, and operation of these models.

Figure 1:
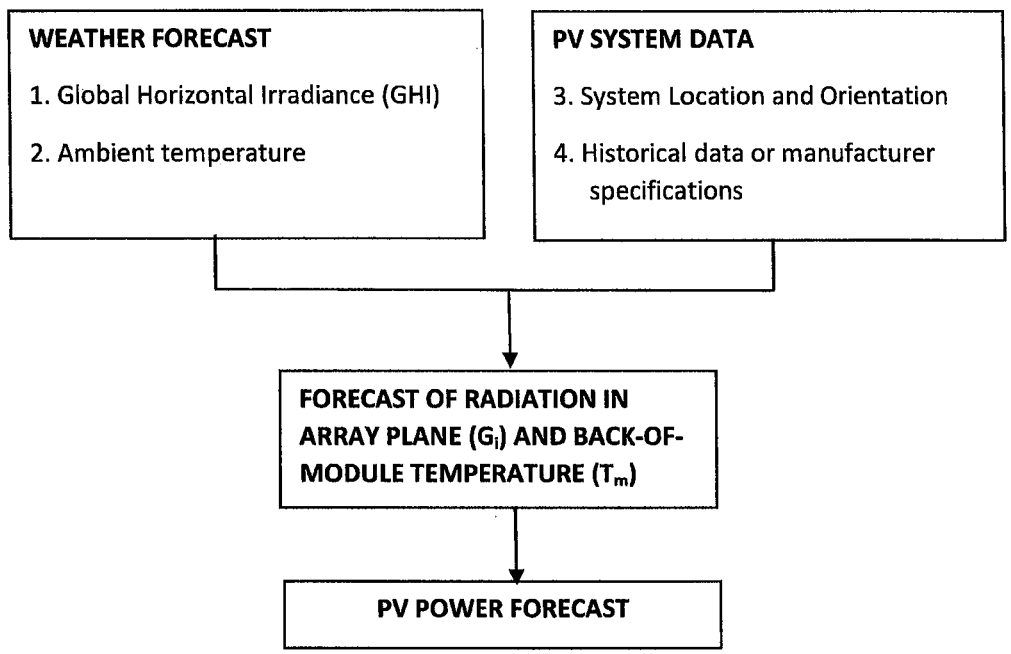
FIG. 1 is a block diagram illustrating a typical system for implementing a physical approach for generating PV power forecasts from weather forecasts and PV system data in accordance with the prior art.
Figure 2:
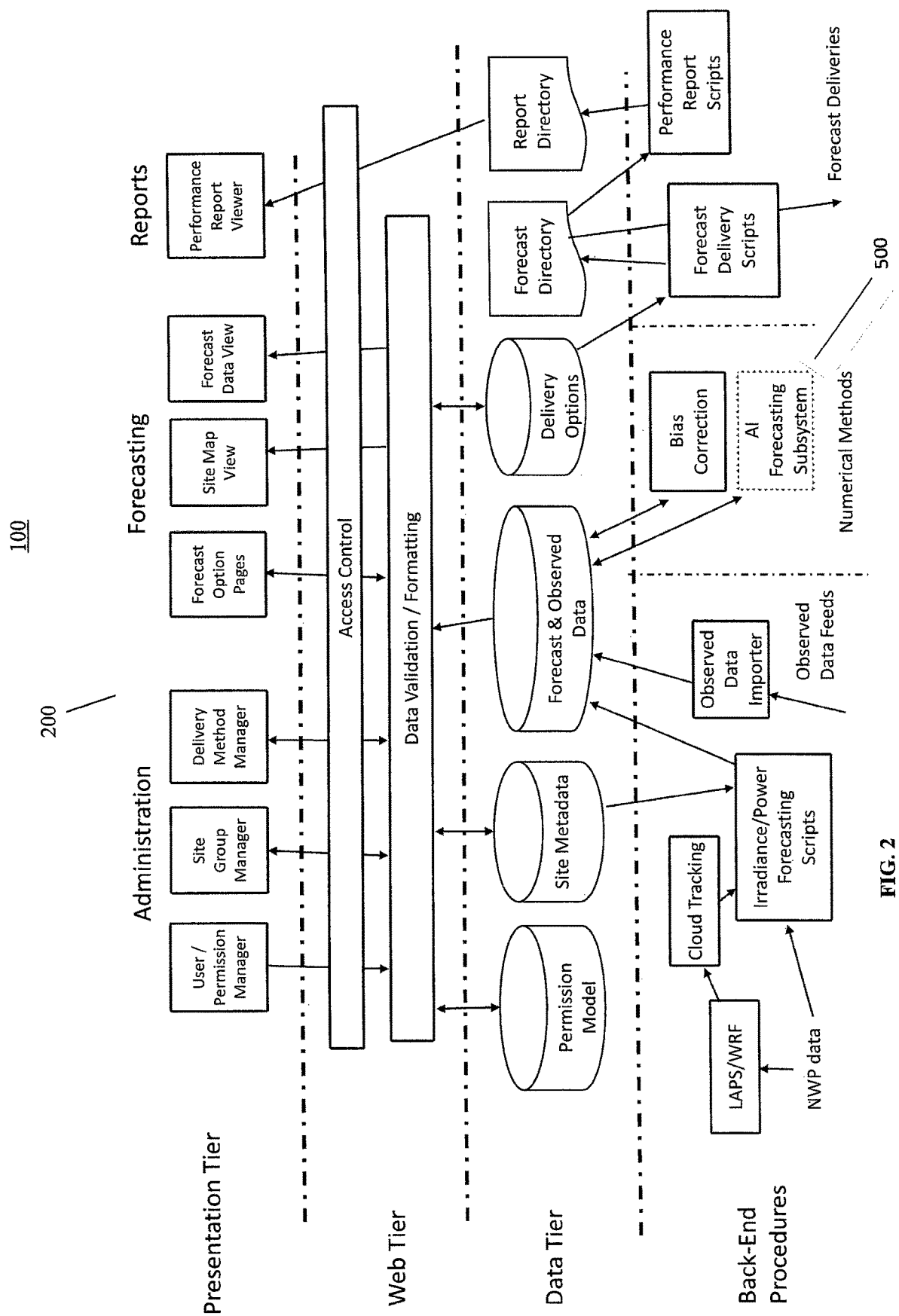
FIG. 2 is a block diagram illustrating a solar power forecasting system and architecture in accordance with an embodiment of the application.

FIG. 2 is a block diagram illustrating a solar power forecasting system 100 and architecture 200 in accordance with an embodiment of the application. According to one embodiment of the present application, the solar power forecasting system 100 may have an architecture 200 which consists of four tiers. The four tiers may be as follows:

a) Presentation Tier. The web interface that is presented to the user through his/her web browser.
b) Application or Web Tier. The server-side component of the web application that processes user requests, and provides access control.
c) Data Tier. The data consists of the database and shared file system.
d) Back-End Procedures Tier. The procedures for generating forecasts, etc.

Figure 3:
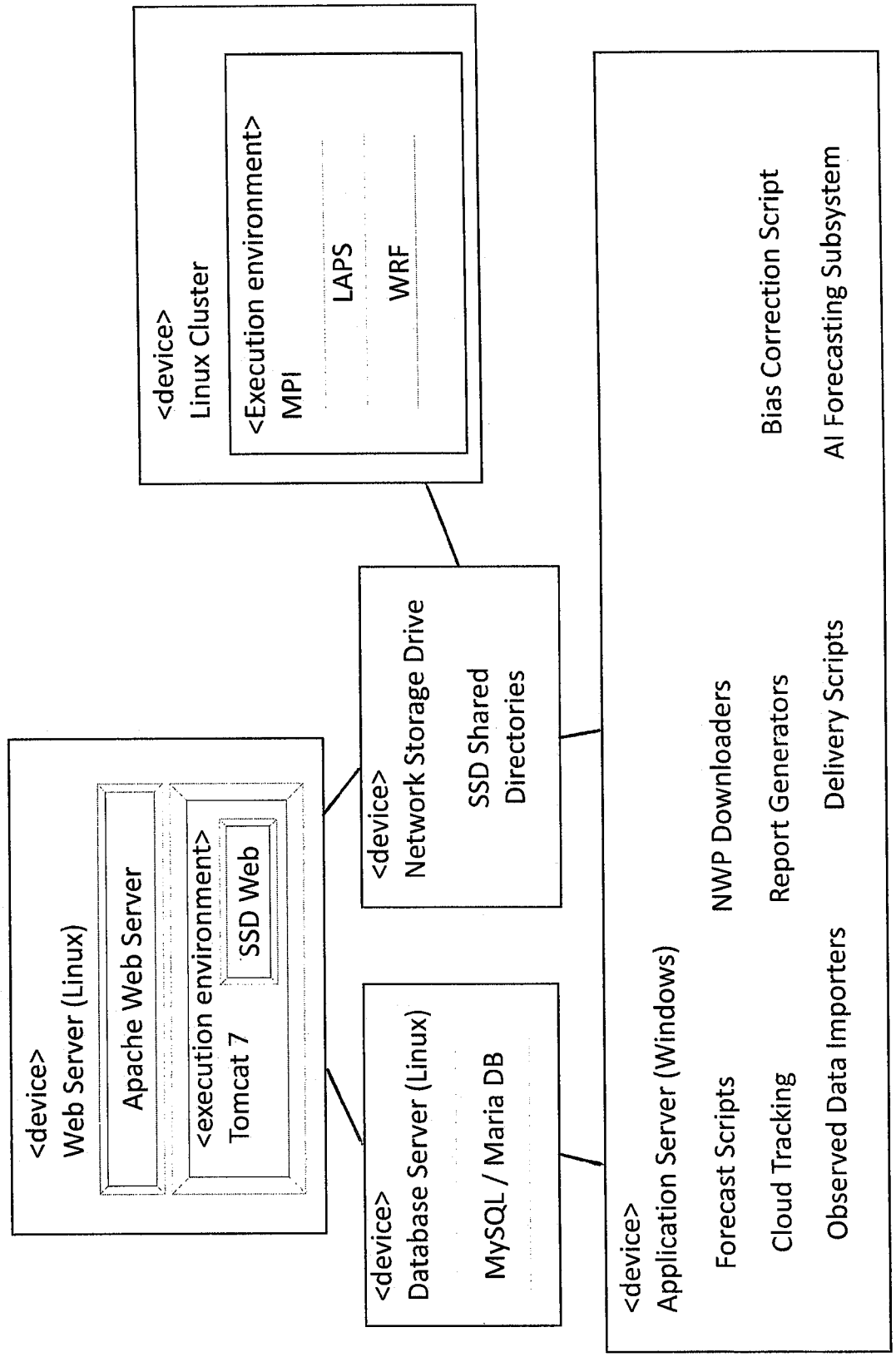
FIG. 3 is a block diagram illustrating a deployment structure for the architecture of FIG. 2 in accordance with an embodiment of the application.

FIG. 3 is a block diagram illustrating a deployment structure 400 for the architecture 200 of FIG. 2 in accordance with an embodiment of the application. FIG. 3 shows how the various components of the solar power forecasting system's architecture 200 relate to the execution environments and hardware that support it. The deployment structure 400 closely mirrors the architecture 200 of FIG. 2. The web server (e.g., 300 in FIG. 4) hosts the presentation and web tiers. It may operate in a Linux™ environment that has access to the database through Java™ database connectivity ("JDBC"), and access to mount points on the network storage drive through the Samba™ protocol. The web application hosted in Tomcat™ 7 is made available to the standard HTTP port (80) using a Tomcat™ connector plugin for the Apache™ web server. The database and network storage drive host the data tier. The database management system may be MySQL™ 5.5 or an equivalent version of MariaDB™. It is populated with the solar forecasting data model. The database must grant appropriate permissions to the web server and application server (e.g., 300 in FIG. 4). The application server and Linux™ cluster correspond to the back-end procedures tier. As the solar power forecasting scripts are Windows™ compatible, the application server must likewise be a Windows™ environment. It uses Windows™ file sharing to access the solar forecasting system's shared directories. The Linux™ cluster hosts the local area forecasting system ("LAPS") and the weather research and forecasting ("WRF") model, and makes use of shared network storage to deliver its data to the solar forecasting system 100.

Figure 4:
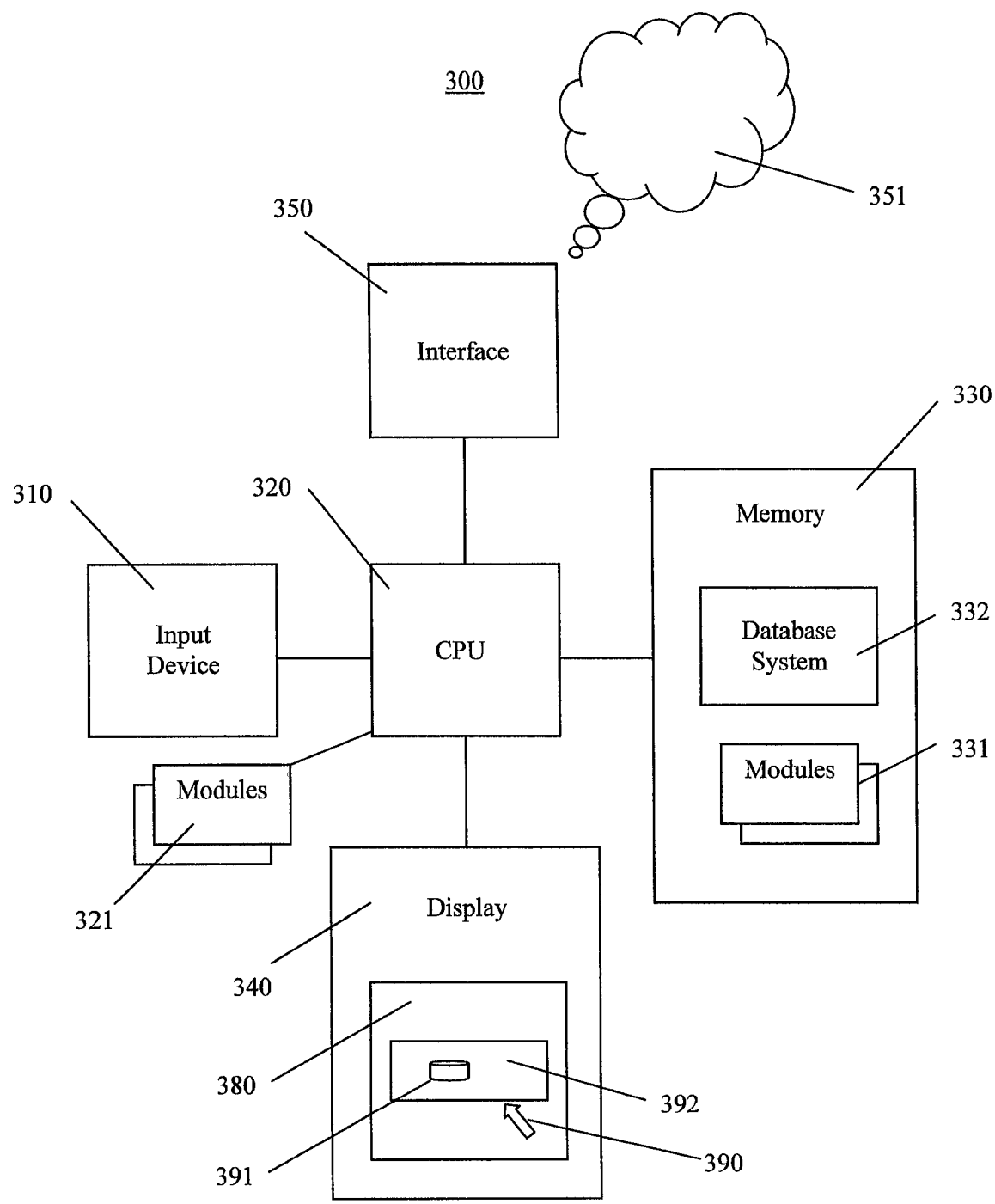
FIG. 4 is a block diagram illustrating a data processing system in accordance with an embodiment of the application.

FIG. 4 is a block diagram illustrating a data processing system 300 in accordance with an embodiment of the invention. The data processing 300 is suitable for performing as a solar power forecasting system 100, 1060 or as various components in the architecture 200 thereof (e.g., web server, application server, etc.), a control system, supervisory control and data acquisition ("SCADA") system, energy management system ("EMS"), or the like. The data processing system 300 is also suitable for data processing, management, storage, and for generating, displaying, and adjusting presentations in conjunction with a user interface or a graphical user interface ("GUI"), as described below. The data processing system 300 may be a client and/or server in a client/server system (e.g., 100). For example, the data processing system 300 may be a server system or a personal computer ("PC") system. The data processing system 300 may also be a distributed system which is deployed across multiple processors. The data processing system 300 may also be a virtual machine. The data processing system 300 includes an input device 310, at least one central processing unit ("CPU") 320, memory 330, a display 340, and an interface device 350. The input device 310 may include a keyboard, a mouse, a trackball, a touch sensitive surface or screen, a position tracking device, an eye tracking device, a camera, a tactile glove or gloves, a gesture control armband, or a similar device. The display 340 may include a computer screen, a television screen, a display screen, a terminal device, a touch sensitive display surface or screen, a hardcopy producing output device such as a printer or plotter, a head-mounted display, virtual reality ("VR") glasses, an augmented reality ("AR") display, a hologram display, or a similar device. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae, etc. Thus, the data processing system 300 may be linked to other data processing systems by the network 351. In addition, the interface 351 may include one or more input and output connections or points for connecting various sensors, status (indication) inputs, analog (measured value) inputs, counter inputs, analog outputs, and control outputs to the data processing system 300.

In addition, the data processing system 300 may include a Global Positioning System ("GPS") receiver. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands, queries, or data and to the display 340 for displaying the results of these commands, queries, or data to the user. Commands, queries, and data may also be received via the interface device 350 and results and data may be transmitted via the interface device 350. The data processing system 300 may include a data store or database system 332 for storing data and programming information. The database system 332 may include a database management system (e.g., 332) and a database (e.g., 332) and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the application.

Thus, the data processing system 300 includes computer executable programmed instructions for directing the system 300 to implement the embodiments of the present application. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium or product (e.g., one or more digital video disks ("DVDs"), compact disks ("CDs"), memory sticks, etc.) which may be used for transporting the programmed instructions to the memory 330 of the data processing system 300. Alternatively, the programmed instructions may be embedded in a computer-readable signal or signal-bearing medium or product that is uploaded to a network 351 by a vendor or supplier of the programmed instructions, and this signal or signal-bearing medium or product may be downloaded through an interface (e.g., 350) to the data processing system 300 from the network 351 by end users or potential buyers.

A user may interact with the data processing system 300 and its hardware and software modules 321, 331 using a user interface such as a graphical user interface ("GUI") 380 (and related modules 321, 331). The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by selecting or "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 5:
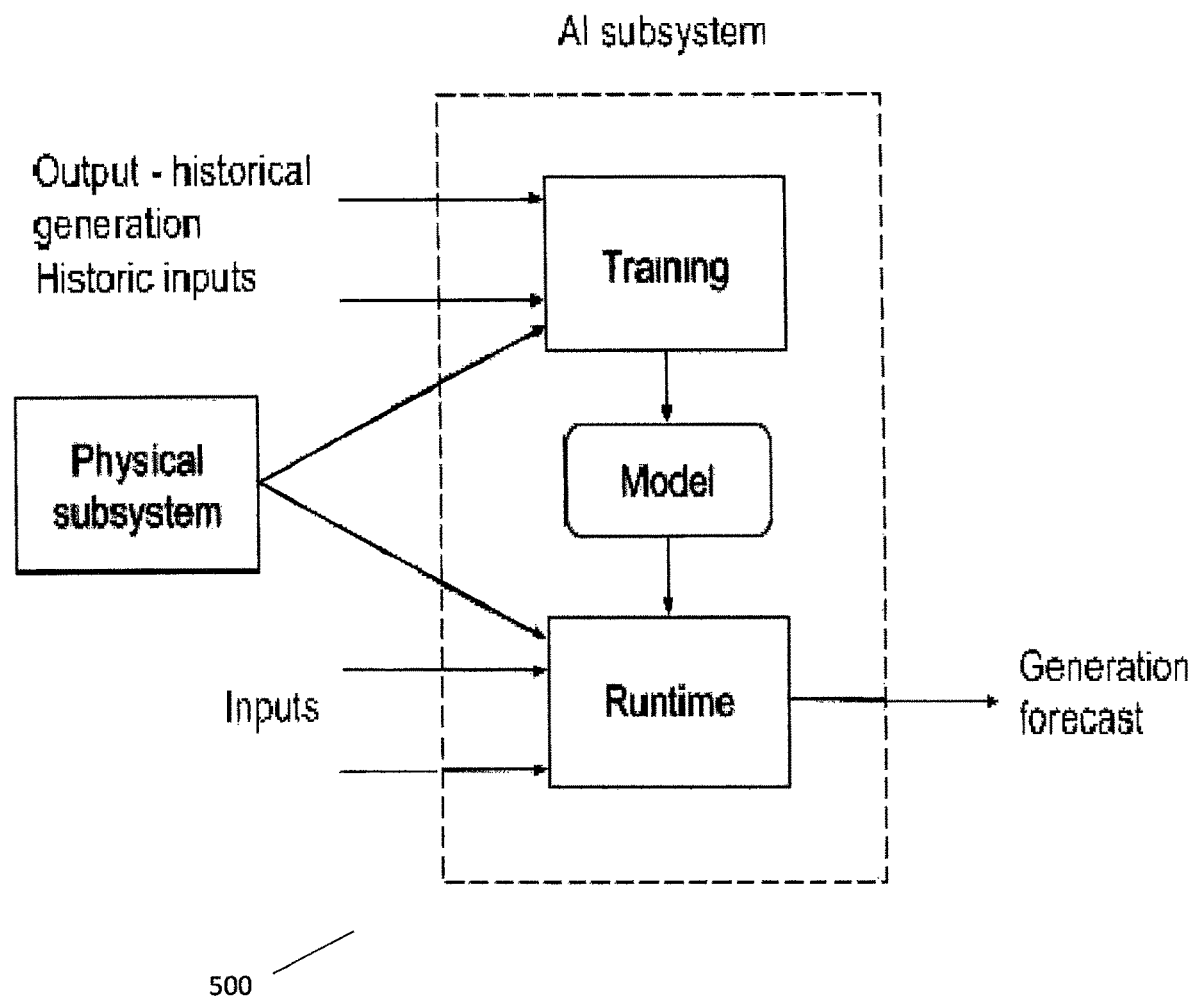
FIG. 5 is a block diagram illustrating a hybrid physical and AI system for solar power forecasting in accordance with an embodiment of the application.

FIG. 5 is a block diagram illustrating a hybrid physical and AI system 500 for solar power forecasting in accordance with an embodiment of the application. According to one embodiment of the present application, there is provided a PV generation forecasting system 100 that implements a novel hybrid approach to orchestrating physical and artificial intelligence ("AI") systems or subsystems 500. The physical subsystem implements WRF and other numerical weather prediction models, satellite imagery processing models, cloud tracking models and solar power plant models and may include other physical model components. The AI subsystem 500 implements autoregressive integrated moving average ("ARIMA"), regression and other statistical methods and AI methods including artificial neural networks ("ANN"), support vector machines ("SVM") and others. FIG. 5 illustrates the hybrid architecture of the present application. Project specific method selection is done during model validation to improve forecasting accuracy. Outputs from the physical subsystem serve as AI subsystem inputs. Other AI subsystem inputs may include measured generation, measured and forecast weather, and other operational parameters. During the training process historical inputs and PV power generation outputs are used to train the model. A trained model is used at runtime to produce a generation forecast based on the inputs from physical subsystems as well as other parameters. Specifically, in runtime at any time $T_0$, the method of the present application uses observed data at $T_0$ and forecasts from physical models at $T_0$ for forecast horizon $T_1$ to produce the final forecast for $T_1$.

With respect to forecast horizons and forecast accuracy, the major forecast horizons established by the industry include:
  a) Day-ahead horizon ("DA"), typically 72 hours ahead and sometimes up to 168 hours ahead;
  b) Hour-ahead horizon ("HA"), typically 3 hours ahead and sometimes up to 6 hours ahead; and,
  c) Intra-hour horizon ("IH"), typically 5-minute temporal resolution 15 minutes ahead.

Forecast accuracy is generally defined by such metrics as mean bias, mean absolute error, and root mean square error.

Forecast accuracy at different forecast horizons strongly depends on the forecast methods and models used. However, for a balanced combination of physical and statistical forecasting models it is expected that forecast accuracy is correlated with forecast horizons and is higher at shorter horizons and lower at longer time horizons.

Other factors having an impact on forecast accuracy include solar microclimatology, intra-day, and intra-hour intermittency of cloudiness and related ramp rates.

Naïve forecasts produced by the system 100, 500 provide a benchmark for the physical and statistical methods. Generally, a naive forecast produces results equal to the last observed data. Since PV generation has a well pronounced seasonality, the naive forecast accounts for this. The prediction value is set to yesterday's same time of the day observed value.

Forecast model training and calibration with historically observed data in accordance with embodiments of the present application will be described in the following in terms of: hindcasting (or retrospective forecasting) as a means for model training and calibration; selected numerical weather predictions for hindcasting; systematic error compensation; and, forecast performance and forecast accuracy guarantees.

Hindcasting as a Means for Model Training and Calibration. According to one embodiment, hindcasting is used as a means for model training and calibration. "Hindcasting" implies that both historical inputs for forecasting models and as well as observed solar power generation data are available for producing forecasts for time horizons in the past. For example, all data inputs required by physical models at noon on Jan. 1, 2014 and observed solar power generation data both at noon on Jan. 1, 2014 and on Jan. 2, 2014 is made available to produce a day-ahead forecast post-labeled, for example, "noon Jan. 1, 2014" and to validate its accuracy.

Availability of historical data both for model inputs and observed generation outputs allows the system to better train and calibrate hybrid forecasting models. It also allows for the making of improved decisions with respect to expected accuracy of forecasting in real time.

Selected Numerical Weather Predictions for Hindcasting. Different physical forecasting models feature different levels of complexity and as a result these models require different periods of time to run. While this may not be a problem in real time, it may create a technical challenge for hindcasting when forecast data time series have to be produced for a whole selected forecast period. This is especially applicable to using high resolution WRF numerical weather prediction ("NWP") models. To deal with this issue, an optimal NWP source and model should be selected to meet the calculation time constraints while meeting the target forecast accuracy.

Figure 6:
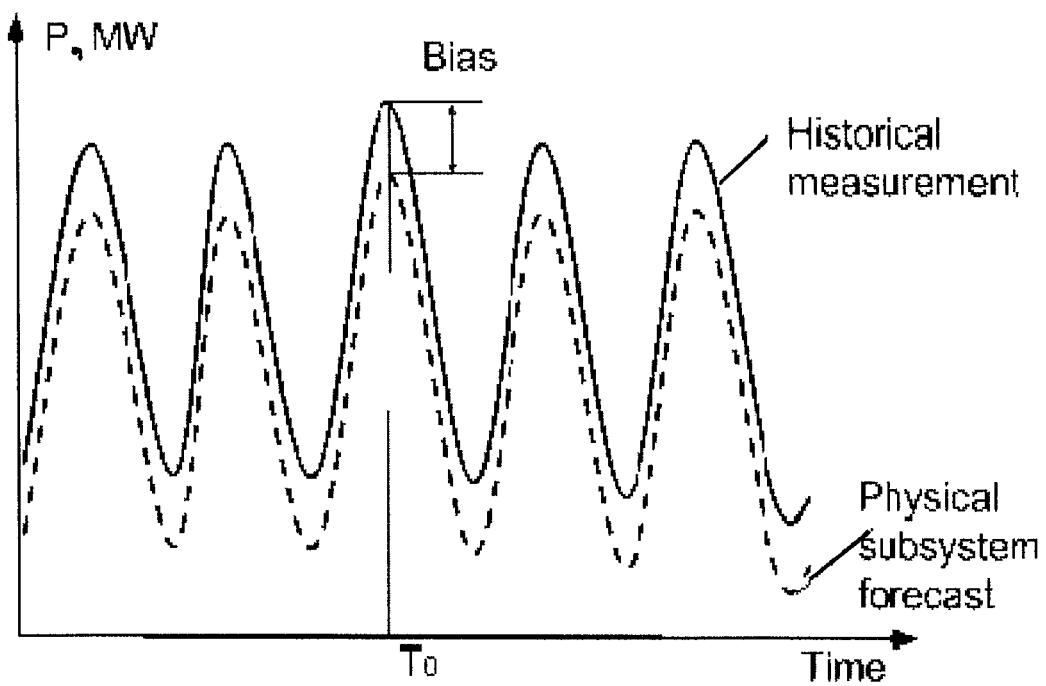
FIG. 6 is a graph illustrating AI model training to compensate for physical model bias in accordance with an embodiment of the application.

Systematic Error Compensation. FIG. 6 is a graph illustrating AI model training to compensate for physical model bias in accordance with an embodiment of the application. With respect to bias compensation, the AI subsystem 500 compares generation forecasts with generation measurements over the training period to train the models thus yielding lower systematic errors, also known as forecast bias. From Wikipedia™, one definition of forecast bias is as follows: "A forecast bias occurs when there are consistent differences between actual outcomes and previously generated forecasts of those quantities; that is: forecasts may have a general tendency to be too high or too low. A normal property of a good forecast is that it is not biased". FIG. 6 illustrates bias compensation training for an AI model. Historical generation measurements are used as the outputs and physical subsystem forecasts are used as the inputs to train the model. The model will learn the bias and compensate for the bias at runtime.

Figure 7:
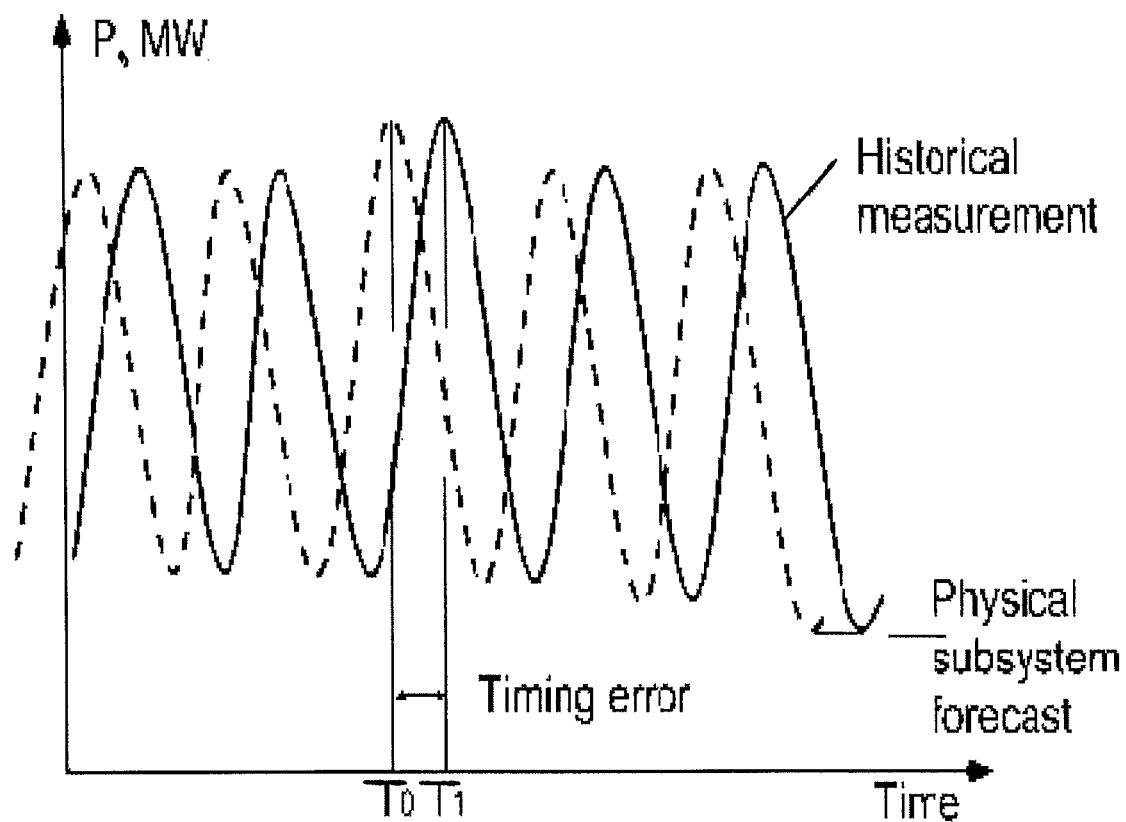
FIG. 7 is a graph illustrating AI model training to compensate for physical model timing error in accordance with an embodiment of the application.

FIG. 7 is a graph illustrating AI model training to compensate for physical model timing error in accordance with an embodiment of the application. With respect to timing error compensation, the physical models can produce timing errors when, for example, forecast ramp-up, peak, ramp-down, and nadir lag behind the measurements. The system 100, 500 compares generation forecasts with the measurements to train the models thus yielding lower timing error. FIG. 7 illustrates timing error compensation training for an AI model. Note that physical subsystem forecasts lag behind generation measurements. Historical generation measurement at time $T_0$ is used as the output to train the AI model. Physical subsystem forecasts at various time horizons are used among other inputs. In general, a physical forecast can lag or lead observed data and therefore multiple physical forecasts are used centered on $T_0$. The model will learn the timing error comparing errors between the measurements and the forecasts and compensate for this error at runtime.

With respect to compensation extrapolation, the physical models' forecast bias and timing error can change over time.

For example, forecast bias can be positive or higher during one season and negative or lower during another season. Similarly, a forecast can lag behind measurements during a certain period of time and be in advance of measurements during another time period exposing a variable timing error. To minimize the error caused by this behavior, the system 100, 500 optimizes the training time period. The training period is selected to be short enough to have a similar forecast bias and timing error, and long enough to include all necessary information for model training. In addition, during runtime, forecast errors are continuously monitored and if the error increases due to changes in forecast bias, timing error or other reason, the AI model is re-trained with the data with the same statistical properties and this model is used in forecasting. Furthermore, time of the day and seasonality information may be included in the model training. In this case, the AI model can extrapolate adapting to changing forecast bias and timing error during runtime based on the execution data and time.

With respect to missing data imputation, when training models the system 100, 500 uses various methods of imputation, filling in the gaps in the data with suitable replacements.

Forecast Performance and Forecast Accuracy Guarantees. Hindcasting is an ideal tool to assess expected performance of a forecast system and the forecast accuracy in advance of starting operational forecasting for client facilities. It also provides an opportunity to provide clients with a forecast accuracy guarantee statement. Forecast accuracy is continuously monitored. Variable statistical properties may affect forecast accuracy. If the forecast error increases above a certain limit or threshold, the system 100, 500 announces this by sending a text message or email to an authorized operator. The operator then may retrain statistical models based on recent data.

Operating forecasting in runtime in accordance with embodiments of the present application will be described in the following in terms of: physical model selection for different forecast horizons; refining forecast accuracy by artificial intelligence methods; and, missing data imputation in runtime.

Physical Models Selection for Different Forecast Horizons. It has been shown by industry practice that different forecast horizons benefit more from different physical forecast models. Day ahead forecasts are improved when they rely on numerical weather prediction models or ensembles of those. Hour ahead forecasts perform better when satellite imagery processing and cloud tracking models are used. Intra-hour forecasts may also rely heavily on satellite-derived data and cloud tracking.

Figure 8:
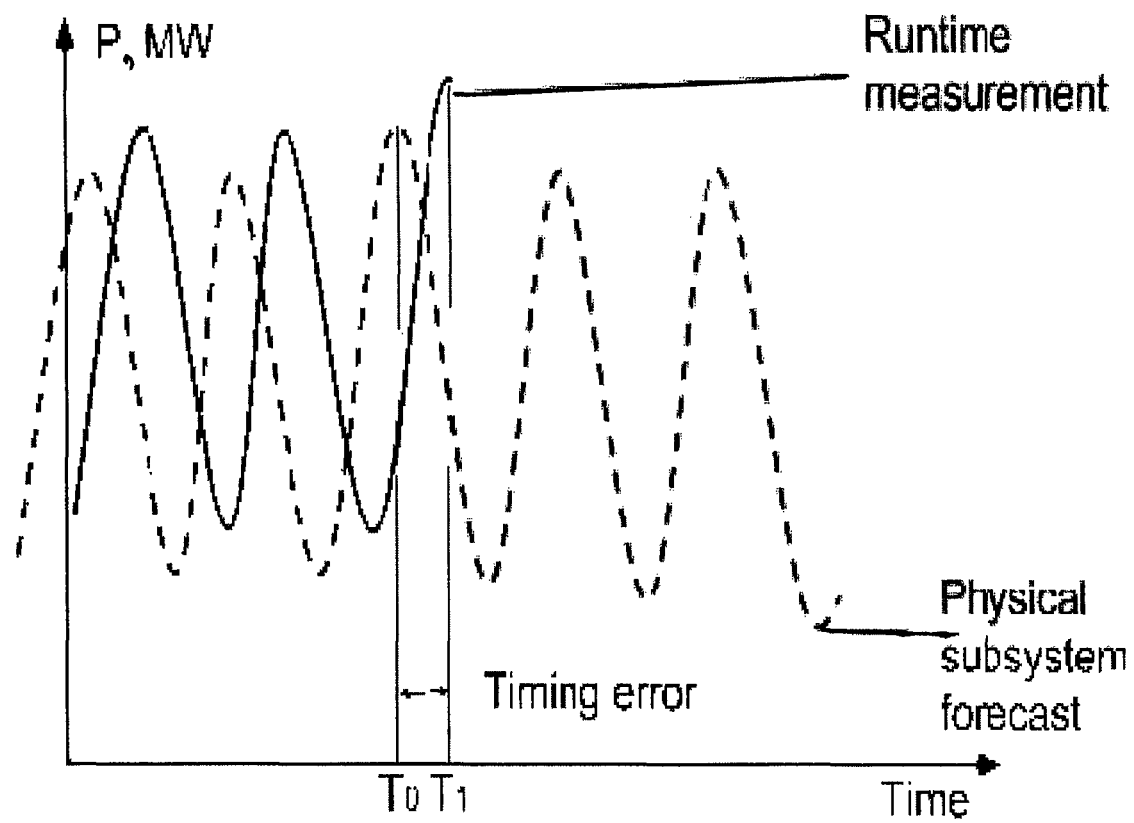
FIG. 8 is a graph illustrating AI physical model refining in accordance with an embodiment of the application.

Refining Forecast Accuracy by Artificial Intelligence Methods. FIG. 8 is a graph illustrating AI physical model refining in accordance with an embodiment of the application. Physical model error may be caused by erroneous cloud geographical position and/or timing errors. At runtime, the AI system 500 may use measurements to refine physical forecasts. FIG. 8 illustrates forecast refining. At runtime, the AI model compares a physical subsystem forecast with the measurements to compensate for value and timing errors. This strategy provides better results for shorter horizons.

The measurements may include values at runtime and multiple past values. For example, a 15 minute ahead forecast produced at time $T_0$ may include the measurements at this time $T_0$ and 15, 30, 45 and 60 minutes prior to it. Input selection may be performed to improve forecasting accuracy.

Missing Data Imputation in Runtime. If data is missing at runtime, the system 100, 500 may produce a forecast based on the present data for different horizons. For example, if data at time $T_1$ necessary to produce a forecast at time $T_f$ for horizon $T_h$ is missing, the AI subsystem 500 may substitute this forecast with the forecast based on data preceding $T_1$ with the longer horizon.

Figure 9:
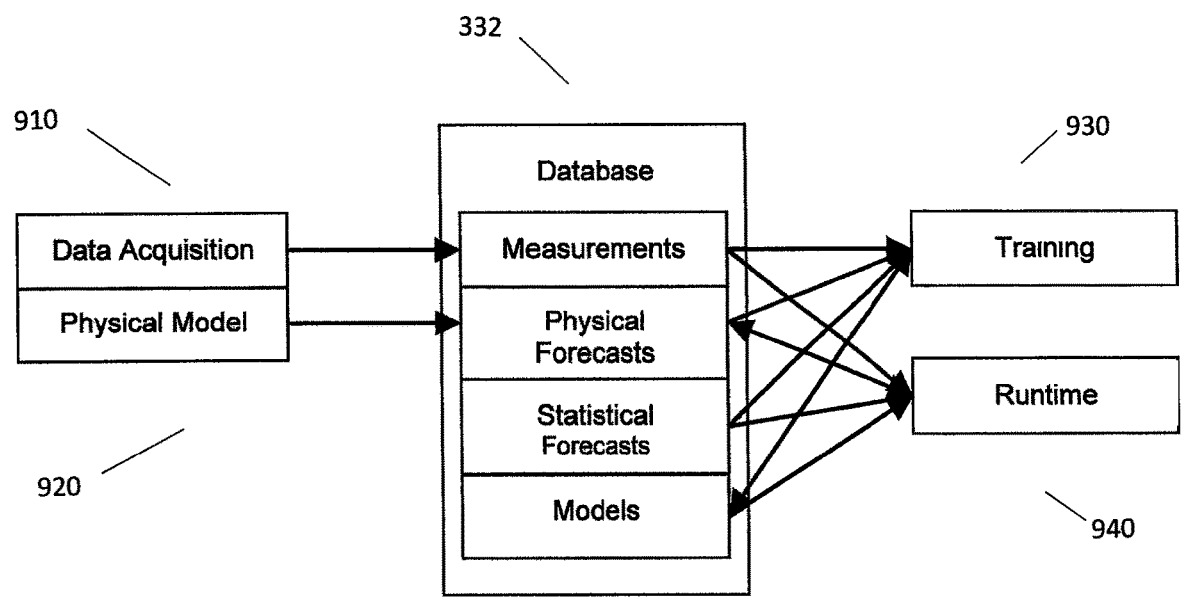
FIG. 9 is a flow diagram illustrating data flows within the solar power forecasting system in accordance with an embodiment of the application.

FIG. 9 is a flow diagram illustrating data flows within the solar power forecasting system 100 in accordance with an embodiment of the application. The database (e.g., 332) serves as a system central repository. The database 332 includes areas to store measurements, forecasts, models and other information. The data acquisition subsystem 910 acquires current and historical measurements from supervisory control and data acquisition ("SCADA") systems, energy management systems ("EMS"), remote terminal units ("RTU"), databases or similar devices and stores these measurements in the measurements database. These measurements include ambient temperatures, global horizontal irradiance, power flows, and other measurements. Moreover, the data acquisition subsystem 910 acquires and stores in the forecasts database weather forecasts including ambient temperature, global horizontal irradiance, and other forecasts. The physical model 920 module or system stores generation forecasting results in the forecasts database. The forecasts may include PV generation for various horizons.

According to one embodiment, training may be performed in manual and/or automatic modes. In the manual mode, an analyst or user fetches the measurements and physical forecasts. The datasets are separated into two parts, namely, one for training and another for validation. The analyst creates a model using a training subset. After the model is created, its performance is validated with the validation data subset. After the training and validation iterative process is complete, the analyst saves the trained model 930 into the models database. In automatic mode, statistical models are trained and validated in batches. The operator or user may review the results written in various log files. In the runtime mode 940, the calculation engine fetches measurements, physical forecasts, and models from the database, produces a generation forecast, and stores it in the statistical forecasts database.

Figure 10:
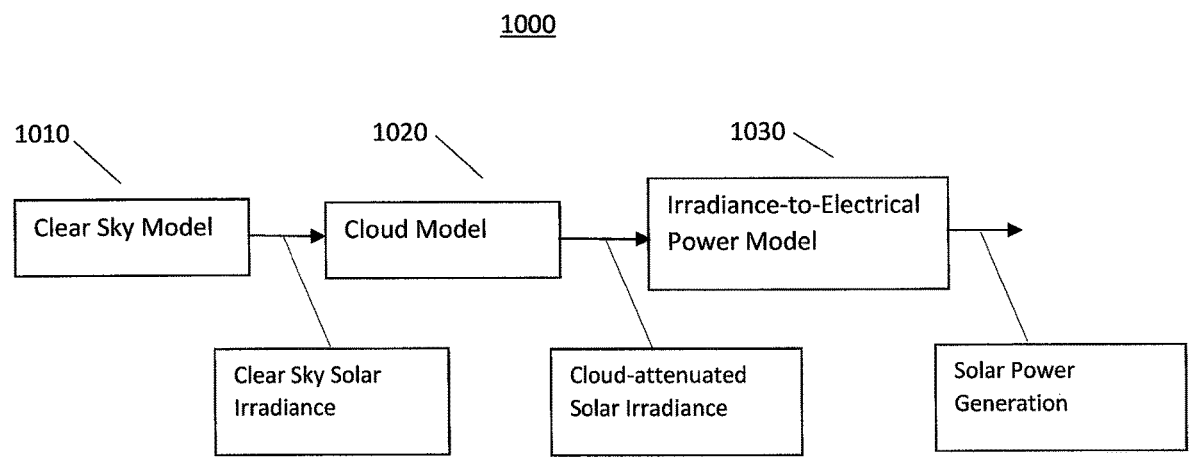
FIG. 10 is a flow diagram illustrating data flows between physical models within the solar power forecasting system in accordance with an embodiment of the application.
Figure 11:
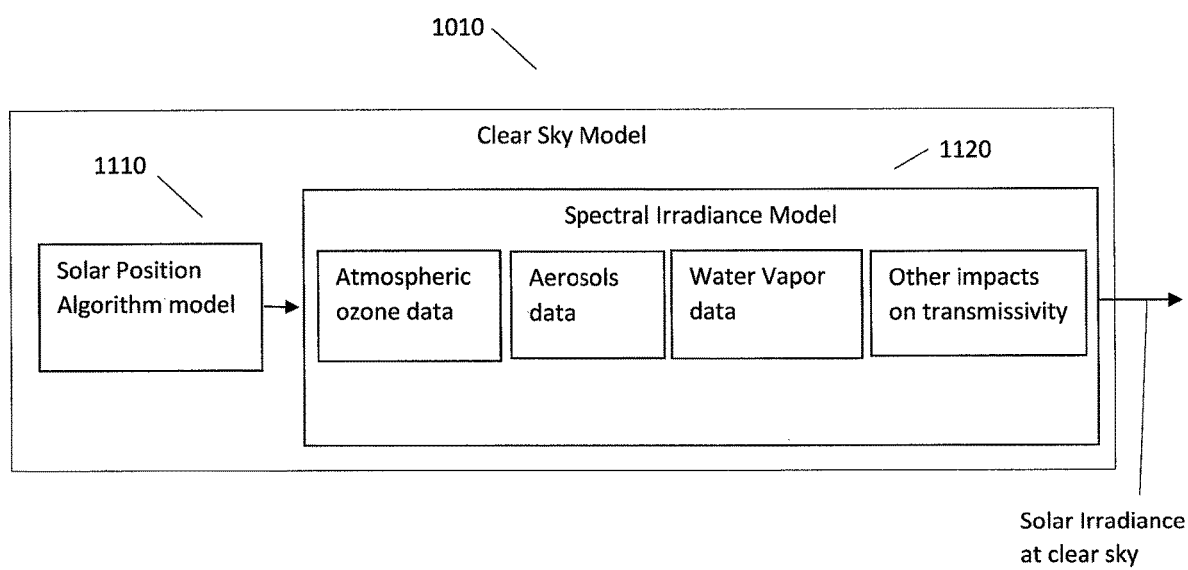
FIG. 11 is a flow diagram illustrating data flows within the clear sky model of FIG. 10 in accordance with an embodiment of the application.
Figure 12:
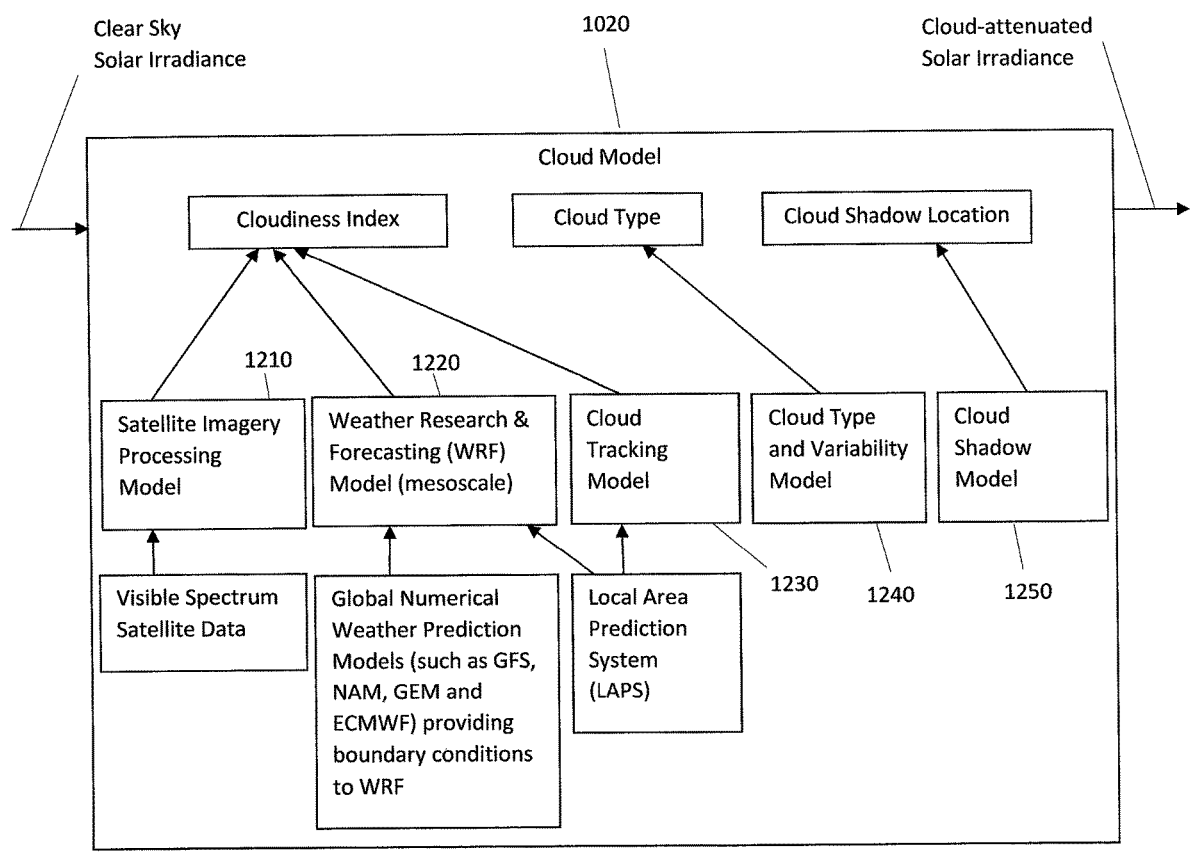
FIG. 12 is a flow diagram illustrating data flows within the cloud model of FIG. 10 in accordance with an embodiment of the application.
Figure 13:
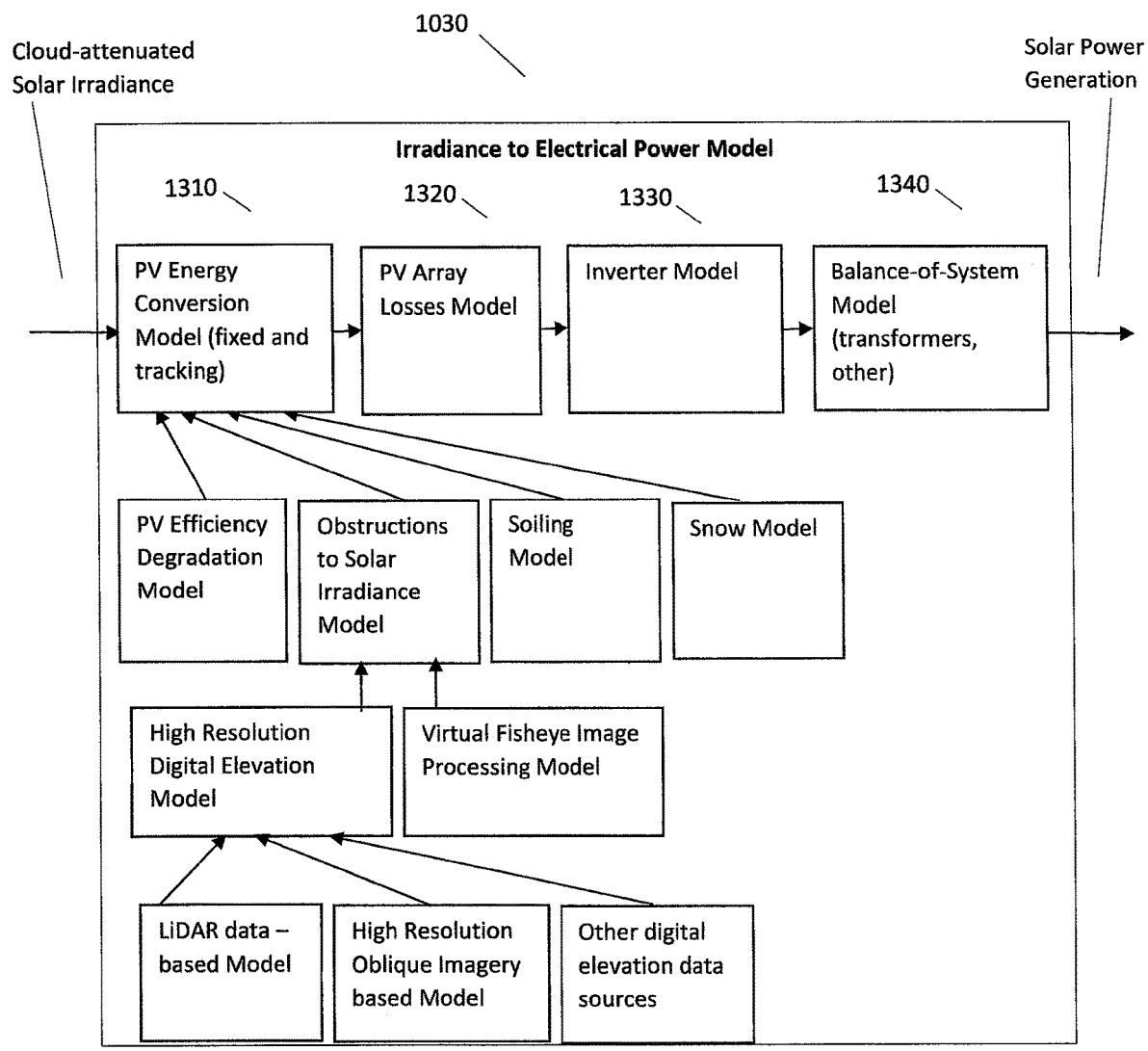
FIG. 13 is a flow diagram illustrating data flows within the irradiance-to-electrical power model of FIG. 10 in accordance with an embodiment of the application.

FIG. 10 is a flow diagram illustrating data flows 1000 between physical models 920 within the solar power forecasting system 100 in accordance with an embodiment of the application. FIG. 11 is a flow diagram illustrating data flows within the clear sky model 1010 of FIG. 10 in accordance with an embodiment of the application. FIG. 12 is a flow diagram illustrating data flows within the cloud model 1020 of FIG. 10 in accordance with an embodiment of the application. And, FIG. 13 is a flow diagram illustrating data flows within the irradiance-to-electrical power model 1030 of FIG. 10 in accordance with an embodiment of the application.

According to one embodiment, the solar power generation model of the present application includes a clear sky model 1010, a cloud model 1020, and an irradiance-to-electrical power model 1030 as shown in FIG. 10. The output of the clear sky model 1010 is solar irradiance in clear sky conditions; the output of cloud model 1020 is solar irradiance after the impact of clouds has been considered; and, the output of the irradiance-to-electrical power model 1030 is solar power generation. Each of these models 1010, 1020, 1030 includes the model inputs shown in FIGS. 11, 12, and 13, respectively.

Referring to FIG. 11, the clear sky model 1010 includes a solar position algorithm model 1110 and a spectral irradiance model 1120 as two major components.

Referring to FIG. 12, the cloud model 1020 includes a satellite imagery processing model 1210 which defines the location of clouds, WRF 1220 and cloud tracking 1230 models which define the future position of the clouds based on the speed and direction of cloud movement, a cloud type and variability model 1240, and a cloud shadow model 1250 both of which define "filtering" characteristics for solar irradiance attenuation.

With respect to the cloud type and variability model (or module) 1240, the amount of light transmitted through the atmosphere depends on the amount of clouds (i.e., the cloud index) and their type. The model 1240 considers at least ten (10) types of clouds as follows: stratus, nimbostratus, stratocumulus, cumulus, cumulonimbus, altostratus, altocumulus, cirrostratus, cirrocumulus, and cirrus. Each type of cloud has characteristic properties. Because of varying cloud properties, the cloud cover alone is generally insufficient for the estimation of passing irradiance. Optical thickness of a cloud is the most important parameter for describing cloud shortwave radiative properties. It is a measure of the attenuation of the light passing through the atmosphere due to scattering and absorption by cloud droplets. The model 1240 operates as follows [.]]: First, the model obtains information from WRF with respect to cloud location, top, and base pressures. Second, based on the foregoing, the model 1240 classifies clouds into one of the ten classes described above to determine a cloud type. Third, the model 1240 applies an attenuation coefficient to the previously calculated clear sky GHI, based on a lookup table of optical thicknesses for different cloud types.

With respect to the cloud shadow model (or module) 1250, in most meteorological studies it is assumed that clouds detected in satellite images or modeled in NWP cast shadows directly beneath them at all times. The same applies to cloud cover used in WRF solar irradiance modeling. For datasets where each cell/pixel size for a region of interest equates to 10 km$^2$ or more, this assumption is generally true, however, the shift in location of shadows on the ground increases with smaller cell sizes, larger zenith angles, and with higher cloud altitudes. The cloud shadow model 1250 accurately calculates the position of cloud shadows using WRF/LAPS cloud cover data as follows: First, the cloud cover data is exported from WRF as a comma separated values ("CSV") file. Second, based on the metadata file, the model reads or receives the following variables: (1) year, month, day, time, time zone; (2) rows, columns—number of rows/columns of data cells in one pressure level table; (3) tables—number of data tables; (4) data gaps—number of skipped rows in CSV prior to start of each consecutive table; and, (5) grid resolution—resolution of each grid cell in meters. Third, cloud, elevation, latitude, and longitude tables are imported from WRF. The lowest pressure table is at ground level, representing the terrain's digital elevation model ("DEM"). Fourth, general solar geometry calculations are performed based on the metadata. Fifth, solar geometry components are calculated for each map cell based on the general solar geometry and latitude/longitude of each cell of the region. Sixth, for each cell, the locations of shadows that fall on a flat surface are calculated. Seventh, for each cell, the locations of shadows that fall on the DEM surface are calculated. This shows the true position of the shadows on the terrain for the region of interest (e.g., the region about or surrounding a solar power plant) and is used for the final output. Eighth, locations of shadows are exported to a CSV file and are used for calculating the cloud index.

Referring to FIG. 13, the irradiance-to-electrical power model 1030 depends on the solar power conversion technology used by the solar power plant such as solar PV, concentrating PV, or concentrating solar thermal. For example, the solar PV irradiance-to-electrical power model 1030 may include four major components as follows: a PV energy conversion model (fixed, one axis and two-axis array tracking) 1310, a PV array losses model 1320, an inverter model 1330, and a balance-of-system model (transformer and other losses) 1340. The PV energy conversion model 1310 includes a PV efficiency degradation model describing natural reduction in efficiency of solar PV cells over time, a soiling model describing reduction in efficiency of solar cells due to soiling of their surfaces, a snow model describing reduction in efficiency of PV panels due to full or partial snow cover, and an obstructions to solar irradiance model. The obstructions to solar irradiance model includes two major components as follows: a high resolution digital elevation model defining obstructions to irradiance from natural or man-made obstructions (e.g., hills, trees, neighbouring buildings, etc.) and a virtual fisheye image processing model for calculating the "filtering" impact of obstructions on available solar irradiance. The high resolution digital elevation model includes several sources of digital elevation data such as a LiDAR data-based model, a high resolution oblique imagery based model, and other sources.

Referring to FIGS. 5 to 13, according to one embodiment, a solar power forecast may be generated for a solar power plant as follows:

First, with respect to training 930, the following steps may be performed:
 a) select a training period of time, daily forecast production schedule, and forecast horizon(s);
 b) read historical outputs such as generation;
 c) read historical inputs such as physical subsystem generation forecasts and other inputs;
 d) visually inspect the data set, test for outliers, missing data, and other data defects;
 e) remove and/or replace bad quality data;
 f) apply data pre-processing including filtering, wavelet transforms, or other techniques;
 g) split acquired data set into a training subset and a testing subset;
 h) train AI model with the training subset;
 i) use trained model to produce forecasts from the testing subset;
 j) validate model performance by comparing forecasts with the testing subset outputs and applying statistical measures such as mean absolute error ("MAE"), mean absolute percent error ("MAPE"), or others;
 k) adjust model inputs, data pre-processing, model configuration, and/or training algorithms and repeat the training steps until a satisfactory performing model is built; and,
 l) save the model.

Second, with respect to run-time 940, the following steps may be performed:
 a) read current inputs such as physical subsystem generation forecasts and other inputs for a selected forecast horizon;
 b) apply data pre-processing;
 c) read trained model;
 d) produce generation forecasts; and,
 e) store the forecasts in the database 332.

In the above, with respect to the production of historical inputs from physical subsystem generation forecasts for training 930, for each forecast production time during the selected training period according to forecast production schedule and selected forecast horizon(s), the following steps may be performed:

a) run the clear sky model 1010 and produce global horizontal irradiance ("GHI") data at clear sky;
b) run a cloudiness index/clearness index model to produce cloudiness index data;
c) run the cloud model 1020 using the GHI data at clear sky and the cloudiness index data to produce cloud-attenuated global irradiance data at the plane of array ("POA");
d) run an obstructions to solar irradiance model to calculate the impact of obstructions on available global irradiance at the plane of array;
e) run the PV energy conversion model (fixed or tracking) 1310 to calculate solar power production by individual PV modules; and,
f) run PV array losses, inverter, and balance-of-system models 1320, 1330, 1340 to produce a solar power generation forecast for the solar power plant.

Also in the above, with respect to production of physical subsystem generation forecasts in runtime 940, for a selected forecast horizon, the following steps may be performed:

a) run the clear sky model 1010 and produce global horizontal irradiance ("GHI") data at clear sky;
b) run the cloudiness index/clearness index model to produce cloudiness index data;
c) run the cloud model 1020 using the GHI at clear sky and the cloudiness index data to produce cloud-attenuated global irradiance data at the plane of array;
d) select an obstruction factor to calculate the impact of obstructions on available global irradiance at the plane of array;
e) run PV energy conversion model (fixed or tracking) 1310 to calculate solar power production by individual PV modules; and,
f) run PV array losses, inverter, and balance-of-system models 1320, 1330, 1340 to produce the solar power generation forecast for solar power plant.

The above embodiments may contribute to an improved method and system for solar power forecasting and may provide one or more advantages. First, the method and system of the present application have advantages over prior methods and systems such as Dolara et al., "A Physical Hybrid Artificial Neural Network for Short Term Forecasting of PV Plant Power Output", Energies 2015, 3 Feb. 2015 ("Dolara"), which is incorporated herein by reference. Dolara provides a physical hybrid artificial neural network ("PHANN") for short term forecasting of photovoltaic ("PV") plant power output. The following is stated on page 1142 of Dolara: "In particular the novelty of the proposed method is that, starting from the available historical data of a real PV plant in a specific place and historical data of a weather forecasting service for the same location, it is capable to predict the daily PV power profile more accurately. . . . This method is useful and easy to use, to make a 48 h ahead forecast with good reliability, directly of the PV system power output and not going through the solar irradiance." In Dolara's "Set Up" step as described on page 1142, supervised learning of the PHANN is conducted "employing the output power measured on the PV systems and the historical weather data set." As such, for training of the PHANN, Dolara uses only the output power measured on the PV system and a historical weather dataset. In contrast, and advantageously, according to the present application, the artificial intelligence model is trained using historical output data and historical input data, the historical output data including historical solar power forecasting output forecasts, the historical input data including historical physical subsystem input data and historical physical subsystem forecasts for the solar power plant. As described herein, the use of historical physical subsystem forecasts for generating the trained artificial intelligence model compensates for forecast bias and timing errors. Dolara does not use historical physical subsystem forecasts for the training of its PHANN. In addition, the PHANN in Dolara includes a physical model (the "P" in PHANN) and an artificial neural network ("ANN"). The physical model used is the Clear Sky Solar Radiation Model ("CSRM") which is "a theoretical model of the solar radiation—without clouds—for the specified location, computed according to the geographical coordinates of the PV plant site" (see page 1141 of Dolara). In the "Set Up" step, Dolara compares "expected data" produced by the ANN to "historical-actual ones" to train the ANN (i.e., updating weights between different input variables). This is the basic method for training an ANN. Also, in the "Set Up" step, Dolara sets "all the parameters for the CSRM such as longitude, latitude, tilt and azimuth." In other words, Dolara simply provides the parameters to gather data from the CSRM in this step. It doesn't actually use data from the CSRM to train the ANN. In contrast, and advantageously, according to the present application, historical physical subsystem forecasts are used to generate the trained artificial intelligence model. The physical subsystem used is described herein. For example, the present application's historical physical subsystem forecasts take into account solar power production by individual photovoltaic ("PV") modules of the solar power plant and PV array, inverter, and balance-of-system losses of the solar power plant. As such, it is not merely the CSRM. In fact, the CSRM is not a model of a physical subsystem such as a solar power plant at all. Rather, as discussed above and as used in Dolara, the CSRM is "a theoretical model of the solar radiation—without clouds—for the specified location, computed according to the geographical coordinates of the PV plant site" (see page 1141 of Dolara). The advantage to using historical physical subsystem forecasts in the present application's method as described herein is that they allow for compensation of bias and timing errors in the trained artificial intelligence model as described above. Dolara does not provide for the compensation of timing errors in its PHANN. Dolara only discusses bias errors (see page 1143 ("3.1 Set Up") and pages 1143-1144 ("4. Error Definitions") of Dolara). In fact, Dolara is incapable of effectively compensating for timing errors as it does not include any physical subsystem model.

Second, as mentioned above, Dolara provides a physical hybrid artificial neural network ("PHANN") for short term forecasting of photovoltaic ("PV") plant power output. The following is stated on page 1142 of Dolara: "In particular the novelty of the proposed method is that, starting from the available historical data of a real PV plant in a specific place and historical data of a weather forecasting service for the same location, it is capable to predict the daily PV power profile more accurately. . . . This method is useful and easy to use, to make a 48 h ahead forecast with good reliability, directly of the PV system power output and not going through the solar irradiance." In Dolara's "Forecast" step as described on pages 1142-1143, after the PHANN tool is trained, "it can be used to predict the output power of the PV system. The inputs of the tool are: —the weather forecasts provided by the Meteo service; —the CSRM curve. The output of the tool is the expected power produced by the PV plant . . . ." For reference, see FIG. 2 of Dolara. As such, for forecasting with the PHANN tool, Dolara uses only the current weather forecast and the CSRM curve. In contrast, and advantageously, according to the present application, in a runtime mode, for a predetermined forecast horizon, the trained artificial intelligence model is applied to current input data including current physical subsystem input data and current physical subsystem forecasts for the solar power plant to produce the solar power output forecast for the PV plant. As described herein, the use of current physical subsystem forecasts for generating the solar power output forecast is to compensate for value and timing errors. Dolara does not use current physical subsystem forecasts for PV plant output forecasting. All that Dolara uses is the current weather forecast and the CSRM curve. In addition, in the "Forecast" step, Dolara's trained PHANN model receives weather forecasts and CSRM curve data as inputs and generates an expected power produced by the PV plant as the output (see pages 1142-1143 and FIG. 2 of Dolara). As mentioned above, the CSRM is "a theoretical model of the solar radiation—without clouds—for the specified location, computed according to the geographical coordinates of the PV plant site" (see page 1141 of Dolara). As such, the CSRM is not a model of a physical subsystem such as a solar power plant. In fact, Dolara specifically states that it does not apply the CSRM data to a physical subsystem model before inputting it to their PHANN model and that this is one of the advantages of their method. That is, Dolara's PHANN model receives raw CSRM data that is independent of the physical subsystems of the PV plant. As mentioned above, the following is stated on page 1142 of Dolara: "In particular the novelty of the proposed method is that, starting from the available historical data of a real PV plant in a specific place and historical data of a weather forecasting service for the same location, it is capable to predict the daily PV power profile more accurately. . . . This method is useful and easy to use, to make a 48 h ahead forecast with good reliability, directly of the PV system power output and not going through the solar irradiance." In this way, Dolara teaches away from the use of physical subsystem models. In contrast, and advantageously, according to the present application, in the runtime mode, for a predetermined forecast horizon, the trained artificial intelligence model is applied to current input data including current physical subsystem input data and current physical subsystem forecasts for the solar power plant to produce the solar power output forecast for the PV plant. The physical subsystem used is described herein. For example, the present application's current physical subsystem forecasts take into account solar power production by individual photovoltaic ('PV') modules of the solar power plant and PV array, inverter, and balance-of-system losses of the solar power plant. As such, it is not merely the CSRM. In fact, the CSRM is not a model of a physical subsystem such as a solar power plant at all. Rather, as discussed above and as used in Dolara, the CSRM is "a theoretical model of the solar radiation—without clouds— for the specified location, computed according to the geographical coordinates of the PV plant site" (see page 1141 of Dolara). The advantage to using current physical subsystem forecasts in the present application's method as described herein is that they allow for compensation of at least timing errors in the trained artificial intelligence model. Dolara does not provide for the compensation of timing errors in its PHANN. Dolara only discusses bias errors (see page 1143 ("3.1 Set Up") and pages 1143-1144 ("4. Error Definitions") of Dolara). In fact, Dolara is incapable of effectively compensating for timing errors as it does not include any physical subsystem model.

Third, while Dolara may use an iterative process for updating the various weights of its ANN, this does not mean that Dolara compensates for timing errors using that iterative process. In contrast, and advantageously, according to the present application, compensation for timing errors is provided.

Aspects of the above described methods and systems may be summarized with the aid of a flowchart.

Figure 14:
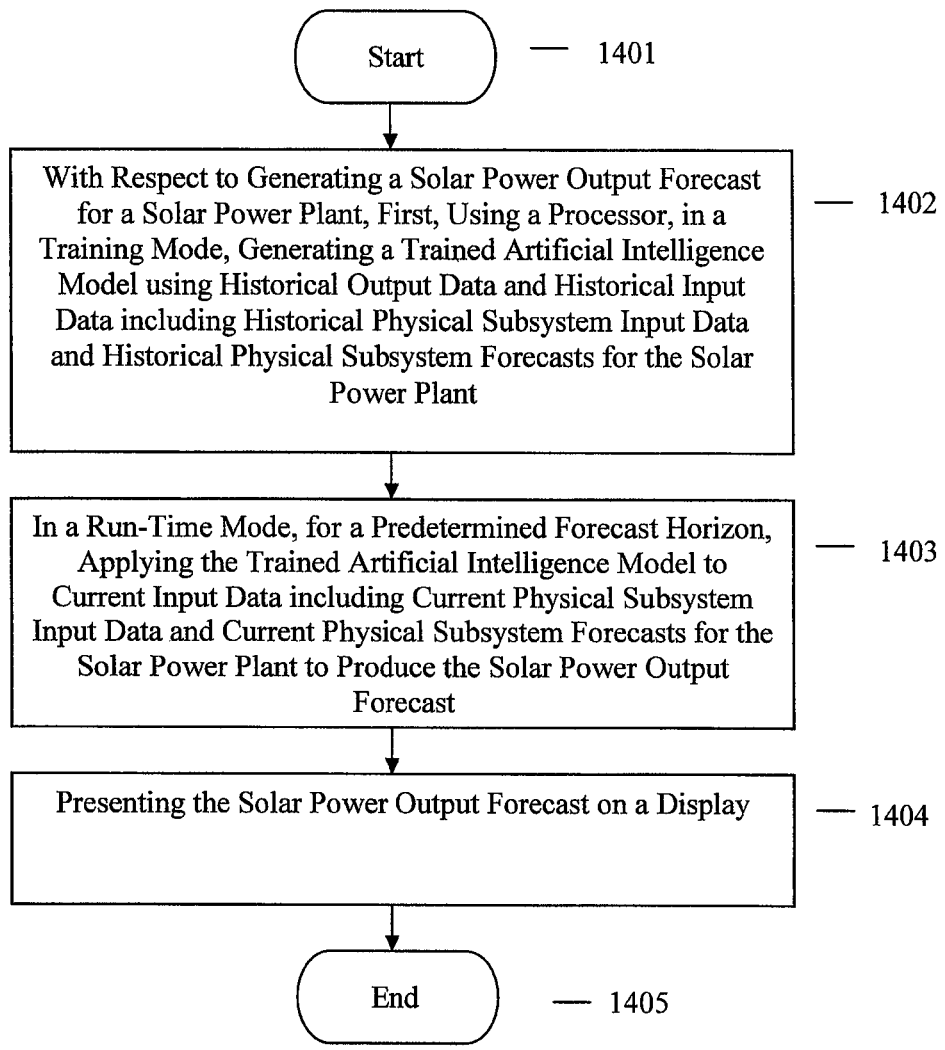
FIG. 14 is a flow chart illustrating operations of modules within a data processing system for generating a solar power output forecast for a solar power plant, in accordance with an embodiment of the application.

FIG. 14 is a flow chart illustrating operations 1400 of modules (e.g., 331) within a data processing system (e.g., 300) for generating a solar power output forecast for a solar power plant, in accordance with an embodiment of the application.

At step 1401, the operations 1400 start.

At step 1402, using a processor 320, in a training mode 930, a trained artificial intelligence model is generated using historical output data and historical input data including historical physical subsystem input data and historical physical subsystem forecasts for the solar power plant.

At step 1403, in a runtime mode 940, for a predetermined forecast horizon, the trained artificial intelligence model is applied to current input data including current physical subsystem input data and current physical subsystem forecasts for the solar power plant to produce the solar power output forecast.

At step 1404, the solar power output forecast is presented on a display 340.

At step 1405, the operations 1400 end.

The above method may further include generating the historical physical subsystem forecasts using the historical input data by: determining a global horizontal irradiance ("GHI") value at clear sky 1010; determining a cloudiness index, a cloud shadow location, and a cloud type; determining a cloud-attenuated global irradiance at a plane of array of the solar power plant from the clear sky GHI value, the cloudiness index, the cloud shadow location, and the cloud type 1020; determining an impact of obstructions on available global irradiance at the plane of array of the solar power plant; determining solar power production by individual photovoltaic ("PV") modules of the solar power plant 1310; and, determining PV array, inverter, and balance-of-system losses of the solar power plant 1320, 1330, 1340. The method may further include generating the current physical subsystem forecasts using the current input data by: determining a global horizontal irradiance ("GHI") value at clear sky 1010; determining a cloudiness index, a cloud shadow location, and a cloud type; determining a cloud-attenuated global irradiance at a plane of array of the solar power plant from the clear sky GHI value, the cloudiness index, the cloud shadow location, and the cloud type 1020; determining an impact of obstructions on available global irradiance at the plane of array of the solar power plant; determining solar power production by individual photovoltaic ("PV") modules of the solar power plant 1310; and, determining PV array, inverter, and balance-of-system losses of the solar power plant 1320, 1330, 1340. The method may further include determining the cloud shadow location 1250 by: receiving cloud cover data from a weather research and forecasting ("WRF") model, the cloud cover data including cloud elevation, latitude, and longitude data for a region in which the solar power plant is located; calculating solar geometry values from the cloud elevation, latitude, and longitude data to determine locations of shadows that fall on a flat surface for the region; and, determining locations of shadows that fall on a digital elevation model ("DEM") surface for the region from the locations of shadows that fall on the flat surface for the region. The method may further include subdividing the region into one or more cells and determining the cloud shadow location for each of the one or more cells. The method may further include determining the cloud type for the cloud 1240 by: obtaining cloud location, top, and base pressure information for a cloud from a weather research and forecasting ("WRF") model; and, using the cloud location, top, and base pressure information for the cloud to look up the cloud type in a cloud classification table. The cloud classification table may include entries for a predetermined number of cloud types. The predetermined number of cloud types may be ten and the cloud classification table may include entries for stratus, nimbostratus, stratocumulus, cumulus, cumulonimbus, altostratus, altocumulus, cirrostratus, cirrocumulus, and cirrus cloud types. The method may further include receiving the historical output data and the historical input data including the historical physical subsystem input data and the historical physical subsystem forecasts for the solar power plant from a database 332. And, the method may further include receiving the current input data including the current physical subsystem input data and the current physical subsystem forecasts for the solar power plant from a data acquisition system 910 coupled to the solar power plant.

According to one embodiment, each of the above steps 1401-1405 may be implemented by a respective software module 331. According to another embodiment, each of the above steps 1401-1405 may be implemented by a respective hardware module 321. According to another embodiment, each of the above steps 1401-1405 may be implemented by a combination of software 331 and hardware modules 321. For example, FIG. 14 may represent a block diagram illustrating the interconnection of specific hardware modules 1401-1405 (collectively 321) within the data processing system or systems 300, each hardware module 1401-1405 adapted or configured to implement a respective step of the method of the application.

Figure 15:
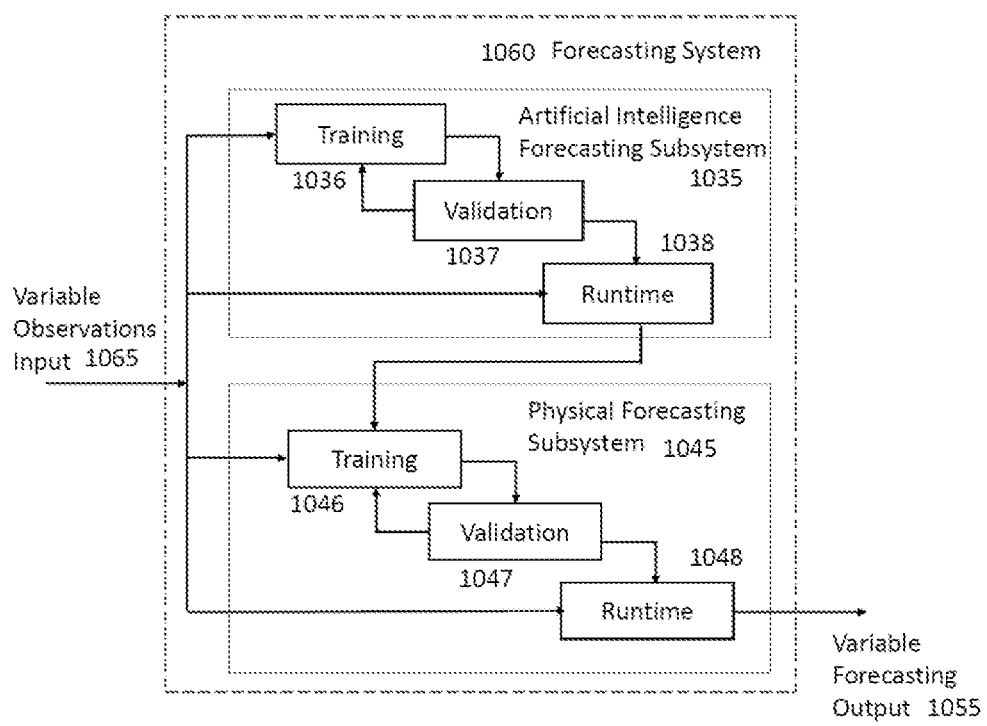
FIG. 15 is a block diagram illustrating a hybrid solar power forecasting system in accordance with an embodiment of the application.
Figure 16:
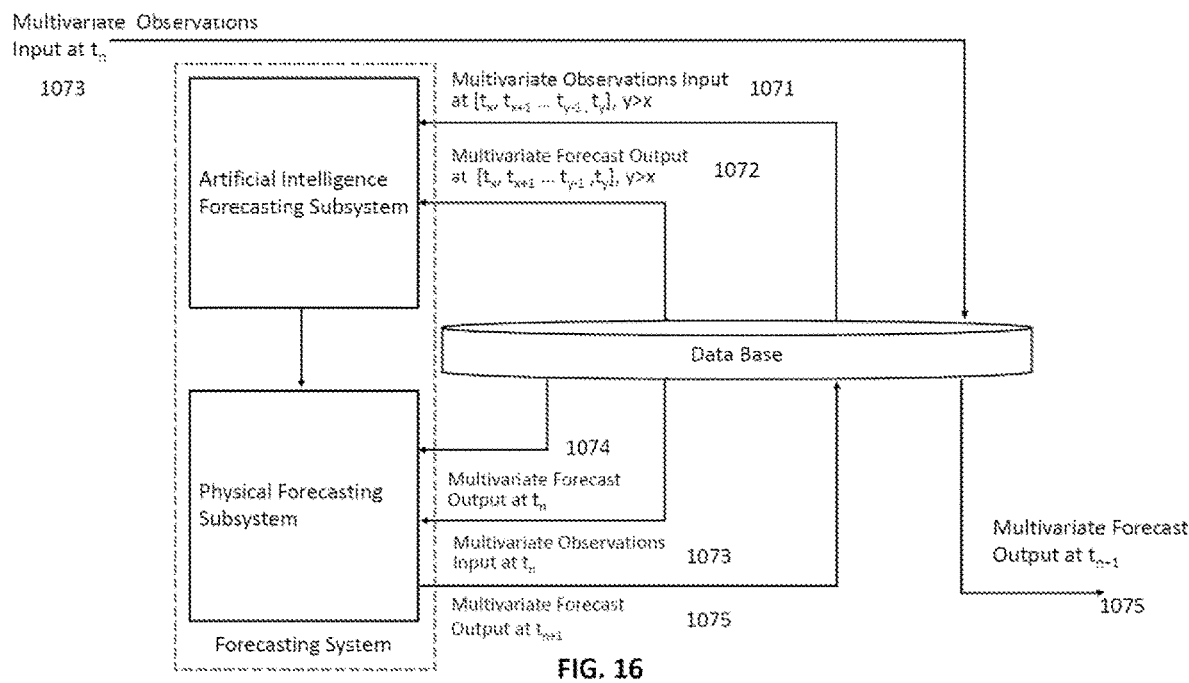
FIG. 16 is a block diagram illustrating process flow in the hybrid system of FIG. 15 in accordance with an embodiment of the application; and, FIG. 17 is a flow chart illustrating operations of modules within a data processing system of the hybrid system of FIG. 15 for generating a solar power output forecast for a solar power plant, in accordance with an embodiment of the application.
Figure 17:
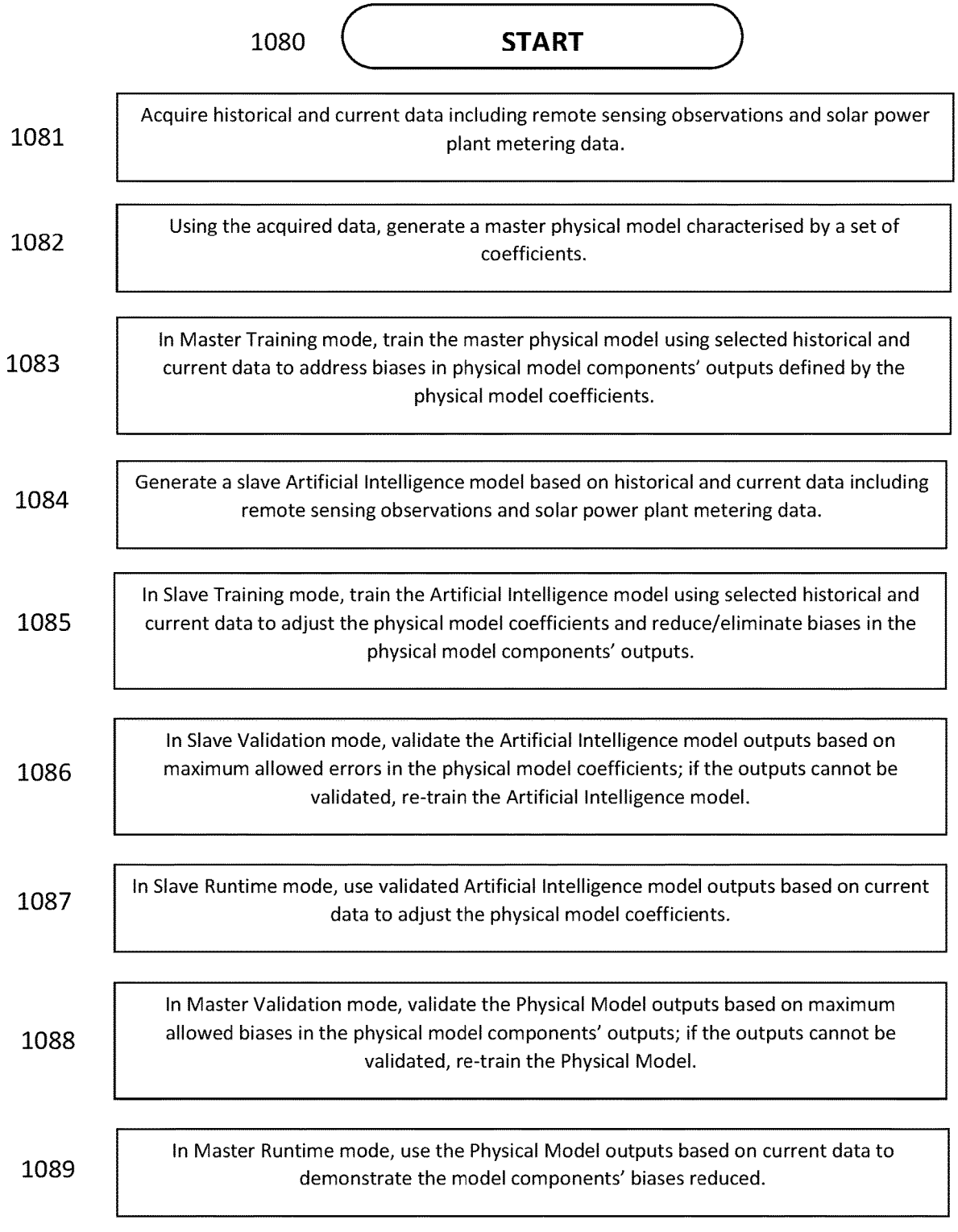

FIG. 15 is a block diagram illustrating a hybrid solar power forecasting system 1060 in accordance with an embodiment of the application. FIG. 16 is a block diagram illustrating process flow in the hybrid system 1060 of FIG. 15 in accordance with an embodiment of the application. And, FIG. 17 is a flow chart illustrating operations 1080-1090 of modules (e.g., 331) within a data processing system (e.g., 300) of the hybrid system 1060 of FIG. 15 for generating a solar power output forecast for a solar power plant, in accordance with an embodiment of the application.

According to one embodiment, the solar power forecasting system 100 is or includes a hybrid computing system 1060. Such hybrid systems use more than one computational technique to address solar power forecasting problems. Integration of multiple techniques in one hybrid system allows for achieving higher quality results in model performance. Hybrid system types used in the solar power forecasting system 1060 may be sequential, embedded, and/or auxiliary. Sequential hybrid systems exhibit a pipe-like flow structure. They are characterized by a straightforward structure and exhibit integration or congregation of a variety of technologies. Embedded hybrid systems undertake an intertwined process flow in soft computing where no technology can be used without the involvement of other hybrid technologies. Examples of embedded hybrid systems in artificial intelligence ("AI") are neural network and fuzzy logic hybrid systems. Auxiliary hybrid systems represent a case where a particular technology includes the other technology as a subroutine. This subroutine ("slave") technology can be called to process information that will be used further in the overall "master" system, e.g., optimizing the inputs in or coefficients of the master system.

The hybrid solar power forecasting system 1060 may include physical models and artificial intelligence (AI) models. The system may further include a hybrid auxiliary system where the physical model is a master subsystem 1045, and at least one artificial intelligence subsystem 1035 that is a slave subsystem (see FIG. 15). The system may further include at least one AI slave subsystem to optimize the master physical subsystem coefficients. According to another embodiment, the hybrid system uses clear sky and atmospheric observation data and solar power plant metering data. The observation data may be based on remote sensing that includes satellite, radar, and ground-based weather stations.

According to one embodiment, the hybrid system 1060 and each of its components operate using the following four modes: verification, training, validation, and runtime. Verification is used to make sure the model or component is physically and operationally sound and works as it should whether it falls close to observations or not. It is built to detail, and each detail is performed as it should. Training (which in physical systems may be called tuning) is used to determine how a change in internal parameters, coefficients, etc. affects a result making it better or worse, which is checked by validation. Validation is used for checking output without questioning how the system outputs are formed. The purpose of validation is to find a way to extract as much information from numeric comparisons as possible. Runtime is the stage of the programming lifecycle mode where program parameters and/or inputs meet related validation requirements, and the system is running alongside all the external instructions needed for proper execution. Some of these external instructions are sometimes referred to as runtime environments.

In the training mode, the solar power forecasting method may include using selected historical and current data to generate trained physical and/or artificial intelligence models which may include observations and metered outputs. Selected historical data define any number of periods between moments $t_x$ and $t_y$, $y>x$, where x can also be 0, y can also be n, and n is the most recent period of time. Current data refers to moment $t_n$ defining the most recent period of time in data acquisition. The hybrid system 1060 may use multivariate observations input at $[t_x, t_{x-1} \ldots t_{y-1}, t_y]$ 1071 and multivariate forecast output at $[t_x, t_{x-1} \ldots t_{y-1}, t_y]$ 1072 for training and validation (see FIG. 16).

In validation mode, two types of validation are used by the solar power forecasting method. One, internal, is aimed to achieve the most efficient, optimal, accurate performance of a single model component through iterative validation and training of the component. The other, ensemble-based, multiple-model output validation addresses coordination, synthesis, fusion of multiple products, assuming each is optimally tuned and calibrated through internal verification, validation and training. The internal validation process, whether alone (on its own) or in conjunction with training is performed independently from runtime operation of the system (with a set frequency, e.g., once a week, a month, a season), while the ensemble validation is performed along with runtime operation allowing to operatively assess reliability validity, performance and skills of each model, to set most optimal weights to each individual product in constructing the ensemble synthetic hybrid product best suiting the predefined goals (e.g., hour-ahead forecast will have a different skillset of the models than a day-ahead). Hindcasting may be used for internal validation of each system and subsystem model and component. In the solar forecasting method, the validation mode may use multi-source output ensembles to meet the validation requirements. The method may further include using external data sources such as external numerical weather prediction sources to add to multi-source output ensembles in selecting the best output to meet the validation requirements.

In the runtime mode, the solar power forecasting method may also include current multivariate observations input at $t_n$ 1073 and multivariate forecast output data at $t_n$ 1074 in the runtime mode to provide multivariate forecast output at $t_{n-1}$ 1075 (see FIG. 16). The runtime component allows for real-time feedback with the internal validation component, and if settings, coefficients and parameters are significantly changed between validation-training sessions, the frequency of such validation can be increased automatically.

FIG. 17 shows the process flow in the hybrid system 1060. According to one embodiment, the three key components of the solar power plant model, that is, the clear sky model 1010, cloud model 1020, and irradiance-to-electrical power model 1030 (see FIG. 10), sometimes altogether called a "digital twin" of solar power plant, are used for verification, training, validation, and runtime operations. The solar power forecasting method may further include using the digital twin of the solar power plant in the hybrid solar power forecasting system 1060. According to one embodiment, the cloud model 1020 becomes a critically important model component of the digital twin because of atmospheric changes in real time. The key outputs of cloud model 1020 are diffuse irradiance and direct normal irradiance defining global irradiance at PV modules/arrays of the solar power plant.

According to one embodiment, a spherical coordinate system-based multistate framework for diffuse irradiance is used in the cloud model 1020. Compared to prior approaches, instead of a single-value cloudiness index based on averaging binary cloud mask, where the binary state (0/1) of each individual point of the mask is based on exceedance of a certain threshold of cloud density estimated or obtained for that point, the above method at any height introduces a two-dimensional cloudiness index, where each point of the respective two-dimensional matrix represented corresponds to a spherical coordinate system using right ascension and declination coordinates. The whole/entire ranges of azimuth and altitude, or right ascension and declination, 360° and 90°, respectively, are binned or subdivided in intervals as optimally determined with respect to computational power and index performance (a smaller number of intervals takes less time to analyze and integrate, a larger number of intervals gives a higher accuracy of diffuse and global irradiance assessment and prediction). Each point of the Cloudiness Index ("CI") matrix presents a multistate value or continuously ranges from 0 to 1, depending on effective cloudiness thickness. This reduces ambiguity in choosing a formal threshold for cloudiness mask creation, as well as allowing the physical model analytics to take into account the effect of cloud density on attenuation, absorption, redistribution, and reflection of solar radiation. According to one embodiment, two or more individual CI matrices can be used in the Cloudy Sky irradiance model, representing, for example, lower mid and high clouds, each covering the whole sky. This also allows for integration of cloud density in a three-dimensional cloudiness environment in the spherical coordinate system using all typical cloud layers such as stratus, nimbostratus, stratocumulus, cumulus, cumulonimbus, altostratus, altocumulus, cirrostratus, cirrocumulus, and cirrus cloud type layers.

The above method may further include using remote sensing data sources such as satellites and radars to develop the three-dimensional multistate framework for diffuse irradiance in the cloud model and use it for two- and three-dimensional Cloudiness Index mapping addressing cloud locations and density for a selected solar power plant in real time. This also allows for real time high-resolution CI using solar altitude angle which allows for bias correcting diffuse irradiance and correspondingly global irradiance at the solar power plant. The 3D Cloudiness Index forecasting of the method allows for improving the accuracy of diffuse irradiance and global irradiance forecasting and, correspondingly, solar power forecasting at the solar power plant.

As an example, in publications using cloudiness cover index available from NWP HRRR in computation of diffuse and direct radiation and resulting Global Horizontal Irradiance, the resulting values exceed the corresponding direct GHI observations. A closer examination shows that the reason for this mismatch in the observed and predicted metrics is the overestimation of direct and underestimation of diffuse irradiance, which in turn are explained by lower than required/needed values of NWP HRRR total cloudiness. Bias correcting the diffuse forecast proposed by the above method through optimally defining the Cloudiness Index allows for improving the accuracy of global irradiance forecasting.

In the above method, the following features may be important in bias correcting the Cloudiness Index and Diffuse Irradiance: compensating for biases in cloud index affecting relative shares of direct normal and diffuse irradiance in global irradiance at the PV plant and its power output; compensating for biases in magnitude of global irradiance forecast with respect to the measured/observed irradiance data; compensating for biases in phase, such as time lag, of the global irradiance forecast with respect to the measured/observed irradiance data; and, compensating for biases in other internal and output components, settings, coefficients and parameters.

According to one embodiment, assimilation techniques may be used by the above method when expected observations are missing. Usually input variables and output variables are produced by the system and observed. But the observed variables may not enter the system as often as expected. The point of assimilation is using observations of the modelled output parameters as a means for nudging a full solution. Data assimilation may be used by the above method by using scattered observations to bring a model solution at any given time in closest agreement with observations. Two techniques are used in the above method. The first technique is based on applying a timed correction to the model output. Unlike in bias correction, this assimilation correction will decay in time reducing to zero. It is based on a weighted average and is called direct data assimilation. The second technique is called inverse data assimilation and operates as follows: compute the differences computed and inversed back into the runtime engine to see how much the driving force needs to be changed to bring the result in close agreement with observations. This assimilation technique is not a static bias fix but a transient adjustment.

While this application is primarily discussed as a method, a person of ordinary skill in the art will understand that the apparatus discussed above with reference to a data processing system 300 may be programmed to enable the practice of the method of the application. Moreover, an article of manufacture for use with a data processing system 300, such as a pre-recorded storage device or other similar computer readable medium or computer program product including program instructions recorded thereon, may direct the data processing system 300 to facilitate the practice of the method of the application. It is understood that such apparatus, products, and articles of manufacture also come within the scope of the application.

In particular, the sequences of instructions which when executed cause the method described herein to be performed by the data processing system 300 may be contained in a data carrier product according to one embodiment of the application. This data carrier product may be loaded into and run by the data processing system 300. In addition, the sequences of instructions which when executed cause the method described herein to be performed by the data processing system 300 may be contained in a computer software product or computer program product (e.g., comprising a non-transitory medium) according to one embodiment of the application. This computer software product or computer program product may be loaded into and run by the data processing system 300. Moreover, the sequences of instructions which when executed cause the method described herein to be performed by the data processing system 300 may be contained in an integrated circuit product (e.g., a hardware module or modules 321) which may include a coprocessor or memory according to one embodiment of the application. This integrated circuit product may be installed in the data processing system 300.

The embodiments of the application described above are intended to be examples only. Those skilled in the art will understand that various modifications of detail may be made to these embodiments, all of which come within the scope of the application.

What is claimed is:

1. A method for generating a solar power output forecast for a solar power plant by a hybrid solar power forecasting system, comprising:

the hybrid solar power forecasting system including a physical subsystem being a master subsystem to generate the solar power output forecast and an artificial intelligence subsystem being a slave subsystem to optimize coefficients of the master subsystem;

the hybrid solar power forecasting system using training, validation, and runtime modes for each of the physical subsystem and the artificial intelligence subsystem; using a clear sky model, a cloud model, and an irradiance-to-electrical-power model of the physical subsystem; using a spherical coordinate system-based multi-state framework for diffuse irradiance in the cloud model of the physical subsystem for representing a three-dimensional ("3D") matrix of cloud density; and, using remote sensing observations of the cloud density and cloud shadow location;

using a processor of the hybrid solar power forecasting system, in a training mode, generating a trained artificial intelligence model to optimize the coefficients of the master subsystem using historical output data and historical input data, the historical output data including selected historical diffuse irradiance and direct normal irradiance forecasts and historical solar power output forecasts, the historical input data including selected historical remote sensing observations of cloud locations and density input data and historical artificial intelligence subsystem output forecasts data, the historical artificial intelligence subsystem output forecasts for bias correcting at least one of biases in cloudiness index of atmosphere in a trained physical subsystem;

in a runtime mode, for a predetermined forecast horizon, applying the trained artificial intelligence model to current input data, the current input data including current remote sensing observations of the cloud locations and the density input data and current artificial intelligence subsystem output forecasts data, the trained physical subsystem to produce a diffuse irradiance forecast, a direct normal irradiance forecast, and the solar power output forecast, the current artificial intelligence subsystem output forecasts data for bias correcting at least one of the biases in the cloudiness index of the atmosphere in the trained physical subsystem; and, presenting the solar power output forecast on a display.

2. The method of claim 1, further comprising generating a physical subsystem model by:

determining a global horizontal irradiance ("GHI") value at clear sky;

determining a cloudiness index, the cloud shadow location, and a cloud type;

determining a cloud-attenuated global irradiance at a plane of array of the solar power plant from the GHI value at clear sky, the cloudiness index, the cloud shadow location, and the cloud type;

determining an impact of obstructions on available global irradiance at the plane of array of the solar power plant;

determining solar power production by individual photovoltaic ("PV") modules of the solar power plant; and, determining PV array, inverter, and balance-of-system losses of the solar power plant.

3. The method of claim 2, further comprising determining the cloud type for a cloud by: obtaining cloud location, top, and base pressure information for the cloud from remote sensing observations; and, using the cloud location, top, and base pressure information for the cloud to look up the cloud type in a cloud classification table.

4. The method of claim 3, wherein the cloud classification table includes entries for a predetermined number of cloud types; and, wherein the predetermined number of cloud types is ten and wherein the cloud classification table includes entries for stratus, nimbostratus, stratocumulus, cumulus, cumulonimbus, altostratus, altocumulus, cirrostratus, cirrocumulus, and cirrus cloud types.

5. The method of claim 1, further comprising determining the cloud shadow location by:

receiving cloud cover data from remote sensing observations, the cloud cover data including cloud elevation, latitude, and longitude data for a region in which the solar power plant is located;

calculating solar geometry values from the cloud elevation, latitude, and longitude data to determine locations of shadows that fall on a flat surface for the region; and, determining the locations of shadows that fall on a digital elevation model ("DEM") surface for the region from the locations of shadows that fall on the flat surface for the region.

6. The method of claim 5, further comprising subdividing the region into one or more cells and determining the cloud shadow location for each of the one or more cells.

7. The method of claim 1, further comprising: receiving the historical output data and the historical input data including historical physical subsystem and artificial intelligence subsystem input data and artificial intelligence subsystem forecasts for the solar power plant from a database;

and, receiving the current input data including the current solar power plant output and sending current physical subsystem forecasts for the solar power plant to a data acquisition system coupled to the solar power plant.

8. The method of claim 1, further comprising determining the cloud density as integrated cloud layer density, receiving cloud cover data from remote sensing observations, defining cloud layers and sub-layers as low-, mid-, and high-level cloud layers, indicating typical cloud types in each of the cloud layers and sub-layers.

9. The method of claim 1, further comprising at least one of: determining the cloudiness index based on integrated cloud layer density; applying a cloud layer framework as a diffuse irradiance multistate framework; using satellite data as remote sensing data; using weather radar data as the remote sensing data; using ground-based weather stations data as the remote sensing data; using multi-source ensemble learning-based training in physical subsystem training mode; using self-learning training model in physical subsystem and artificial subsystem training modes; and, using deep learning training in artificial intelligence subsystem training mode.

10. A solar power forecasting system for generating a solar power output forecast for a solar power plant, comprising:
   a processor coupled to memory and a display; and,
   at least one of hardware and software modules within the memory and controlled or executed by the processor, the modules including computer readable instructions executable by the processor for causing the solar power forecasting system to implement the method of claim 1.

* * * * *